US012639254B2

(12) United States Patent
Kondapaneni et al.

(10) Patent No.: US 12,639,254 B2
(45) Date of Patent: May 26, 2026

(54) MULTI-CAST SNOOP VECTORS WITHIN A MESH TOPOLOGY

(71) Applicant: Akeana, Inc., Santa Clara, CA (US)

(72) Inventors: Madhavi Kondapaneni, Cupertino, CA (US); Aqdas Javaid, Islamabad (PK); Ayesha Zahid, Rawalpindi (PK)

(73) Assignee: Akeana, Inc., Santa Clara, CA (US)

( * ) Notice: Subject to any disclaimer, the term of this patent is extended or adjusted under 35 U.S.C. 154(b) by 35 days.

(21) Appl. No.: 18/938,353

(22) Filed: Nov. 6, 2024

(65) Prior Publication Data

US 2025/0147919 A1 May 8, 2025

Related U.S. Application Data

(60) Provisional application No. 63/714,529, filed on Oct. 31, 2024, provisional application No. 63/702,192, filed on Oct. 2, 2024, provisional application No. 63/699,245, filed on Sep. 26, 2024, provisional application No. 63/691,351, filed on Sep. 6, 2024,
(Continued)

(51) Int. Cl.
| | |
|---|---|
| *G06F 15/17* | (2006.01) |
| *G06F 12/08* | (2016.01) |
| *G06F 12/0831* | (2016.01) |
| *G06F 15/173* | (2006.01) |

(52) U.S. Cl.
CPC .... *G06F 15/17381* (2013.01); *G06F 12/0831* (2013.01); *G06F 15/17337* (2013.01)

(58) Field of Classification Search
None
See application file for complete search history.

(56) References Cited

U.S. PATENT DOCUMENTS

| | | |
|---|---|---|
| 6,934,809 B2 | 8/2005 | Tremblay et al. |
| 7,506,105 B2 | 3/2009 | Al-Sukhni et al. |
| | (Continued) | |

FOREIGN PATENT DOCUMENTS

| | | |
|---|---|---|
| WO | 2022117687 A1 | 6/2022 |

OTHER PUBLICATIONS

Agarwal et al., 'In-Network Coherence Filtering: Snoopy Coherence without Broadcasts' from MICRO'09, Dec. 12-16, 2009. (Year: 2009).*

(Continued)

*Primary Examiner* — Steven G Snyder
(74) *Attorney, Agent, or Firm* — Adams Intellex, PLC

(57) ABSTRACT

Techniques for sharing processor data within a network are disclosed. A system-on-a-chip (SOC) is accessed. The SOC includes a network-on-a-chip (NOC), which comprises an M×N mesh topology. The mesh includes a coherent tile at each mesh point. Each tile includes local snoop vectors (LSVs). A first coherent tile initiates a snoop operation. The tile generates a snoop vector that indicates other tiles to be notified of the snoop operation. The first coherent tile creates directional snoop vectors (DSVs). The creating logically combines the snoop vector with each of the LSVs. A coherent tile adjacent to the first coherent tile is selected. The adjacent tile is located in a cardinal direction from the first tile. A first DSV is chosen based on the cardinal direction. The first tile sends the snoop operation and the chosen first DSV to the selected adjacent tile.

27 Claims, 16 Drawing Sheets

Related U.S. Application Data provisional application No. 63/690,822, filed on Sep. 5, 2024, provisional application No. 63/687,795, filed on Aug. 28, 2024, provisional application No. 63/679,685, filed on Aug. 6, 2024, provisional application No. 63/679,192, filed on Aug. 5, 2024, provisional application No. 63/653,402, filed on May 30, 2024, provisional application No. 63/641,045, filed on May 1, 2024, provisional application No. 63/640,921, filed on May 1, 2024, provisional application No. 63/570,281, filed on Mar. 27, 2024, provisional application No. 63/564,529, filed on Mar. 13, 2024, provisional application No. 63/563,492, filed on Mar. 11, 2024, provisional application No. 63/563,102, filed on Mar. 8, 2024, provisional application No. 63/556,944, filed on Feb. 23, 2024, provisional application No. 63/556,951, filed on Feb. 23, 2024, provisional application No. 63/605,620, filed on Dec. 4, 2023, provisional application No. 63/602,514, filed on Nov. 24, 2023, provisional application No. 63/547,574, filed on Nov. 7, 2023.

(56) References Cited

U.S. PATENT DOCUMENTS

| | | | | |
|---|---|---|---|---|
| 7,805,575 | B1 * | 9/2010 | Agarwal | G06F 12/0811 711/141 |
| 9,672,154 | B1 | 6/2017 | Hsu et al. | |
| 9,830,097 | B2 | 11/2017 | Susarla et al. | |
| 10,013,356 | B2 | 7/2018 | Chou | |
| 10,031,851 | B2 | 7/2018 | Sundaram et al. | |
| 10,671,394 | B2 | 6/2020 | Britto et al. | |
| 10,929,948 | B2 | 2/2021 | Benthin et al. | |
| 11,163,684 | B1 | 11/2021 | Gray et al. | |
| 11,288,405 | B2 | 3/2022 | Belgarric et al. | |
| 11,385,896 | B2 | 7/2022 | Shulyak et al. | |
| 11,403,099 | B2 | 8/2022 | Cerny et al. | |
| 11,403,225 | B2 | 8/2022 | Zheng et al. | |
| 11,429,529 | B2 | 8/2022 | Hornung et al. | |
| 11,442,863 | B2 | 9/2022 | Shulyak et al. | |
| 11,474,130 | B2 | 10/2022 | Lentz et al. | |
| 11,486,911 | B2 | 11/2022 | Tuncer et al. | |
| 2017/0060786 | A1 * | 3/2017 | Morales | G06F 15/173 |
| 2019/0004921 | A1 * | 1/2019 | Fahim | G06F 11/349 |
| 2020/0301854 | A1 * | 9/2020 | Ramagiri | G06F 12/1441 |
| 2020/0394141 | A1 * | 12/2020 | Ramagiri | G06F 12/0817 |
| 2022/0004639 | A1 | 1/2022 | Yardi et al. | |
| 2022/0029780 | A1 | 1/2022 | Dafali | |
| 2022/0197657 | A1 | 6/2022 | Soundararajan et al. | |
| 2022/0382703 | A1 * | 12/2022 | Hayes | G06F 12/0862 |
| 2024/0202125 | A1 * | 6/2024 | Gholkar | G06F 12/0891 |
| 2025/0173268 | A1 * | 5/2025 | Kondapaneni | G06F 12/0831 |
| 2025/0272246 | A1 * | 8/2025 | Kondapaneni | G06F 12/0831 |
| 2025/0370932 | A1 * | 12/2025 | Kondapaneni | G06F 12/0817 |

OTHER PUBLICATIONS

Xilinx, 'Versal ACAP CPM CCIX—Architecture Manual—AM016 (v1.1)' Nov. 24, 2020. (Year: 2020).*

* cited by examiner

604

700

LOCAL SNOOP VECTOR
710

0010 0100 1000 0001

SWITCHING UNIT REPRESENTATION
720

| SU 0 | 1 |
| SU 1 | 0 |
| SU 2 | 0 |
| SU 3 | 0 |
| SU 4 | 0 |
| SU 5 | 0 |
| SU 6 | 0 |
| SU 7 | 1 |
| SU 8 | 0 |
| SU 9 | 0 |
| SU 10 | 1 |
| SU 11 | 0 |
| SU 12 | 0 |
| SU 13 | 1 |
| SU 14 | 0 |
| SU 15 | 0 |

LOCAL SNOOP VECTORS

| SU | NORTH | EAST | WEST | SOUTH |
|---|---|---|---|---|
| 0 | 0000 0000 0000 0000 | 1110 1110 1110 1110 | 0000 0000 0000 0000 | 0001 0001 0001 0000 |
| 1 | 0000 0000 0000 0000 | 1100 1100 110 1100 | 0001 0001 0001 0001 | 0010 0010 0010 0000 |
| 2 | 0000 0000 0000 0000 | 1000 1000 1000 1000 | 0011 0011 0011 0011 | 0100 0100 0100 0000 |
| 3 | 0000 0000 0000 0001 | 0000 0000 0000 0000 | 0111 0111 0111 0111 | 1000 1000 1000 0000 |
| 4 | 0000 0000 0000 0001 | 1110 1110 1110 1110 | 0000 0000 0000 0000 | 0001 0001 0000 0000 |
| 5 | 0000 0000 0000 0010 | 1100 1100 1100 1100 | 0001 0001 0001 0001 | 0010 0010 0000 0000 |
| 6 | 0000 0000 0000 0100 | 1000 1000 1000 1000 | 0011 0011 0011 0011 | 0100 0100 0000 0000 |
| 7 | 0000 0000 0000 1000 | 0000 0000 0000 0000 | 0111 0111 0111 0111 | 1000 1000 0000 0000 |
| 8 | 0000 0000 0001 0001 | 1110 1110 1110 1110 | 0000 0000 0000 0000 | 0001 0000 0000 0000 |
| 9 | 0000 0000 0010 0010 | 1100 1100 1100 1100 | 0001 0001 0001 0001 | 0010 0000 0000 0000 |
| 10 | 0000 0000 0100 0100 | 1000 1000 1000 1000 | 0011 0011 0011 0011 | 0100 0000 0000 0000 |
| 11 | 0000 0000 1000 1000 | 0000 0000 0000 0000 | 0111 0111 0111 0111 | 1000 0000 0000 0000 |
| 12 | 0000 0001 0001 0001 | 1110 1110 1110 1110 | 0000 0000 0000 0000 | 0000 0000 0000 0000 |
| 13 | 0000 0010 0010 0010 | 1100 1100 1100 1100 | 0001 0001 0001 0001 | 0000 0000 0000 0000 |
| 14 | 0000 0100 0100 0100 | 1000 1000 1000 1000 | 0011 0011 0011 0011 | 0000 0000 0000 0000 |
| 15 | 0000 1000 1000 1000 | 0000 0000 0000 0000 | 0111 0111 0111 0111 | 0000 0000 0000 0000 |

MULTI-CAST SNOOP VECTORS WITHIN A MESH TOPOLOGY

RELATED APPLICATIONS

This application claims the benefit of U.S. provisional patent applications "Multi-Cast Snoop Vectors Within A Mesh Topology" Ser. No. 63/547,574, filed Nov. 7, 2023, "Optimized Snoop Multi-Cast With Mesh Regions" Ser. No. 63/602,514, filed Nov. 24, 2023, "Cache Snoop Replay Management" Ser. No. 63/605,620, filed Dec. 4, 2023, "Processing Cache Evictions In A Directory Snoop Filter With ECAM" Ser. No. 63/556,944, filed Feb. 23, 2024, "System Time Clock Synchronization On An SOC With LSB Sampling" Ser. No. 63/556,951, filed Feb. 23, 2024, "Malicious Code Detection Based On Code Profiles Generated By External Agents" Ser. No. 63/563,102, filed Mar. 8, 2024, "Processor Error Detection With Assertion Registers" Ser. No. 63/563,492, filed Mar. 11, 2024, "Starvation Avoidance In An Out-Of-Order Processor" Ser. No. 63/564,529, filed Mar. 13, 2024, "Vector Operation Sequencing For Exception Handling" Ser. No. 63/570,281, filed Mar. 27, 2024, "Vector Length Determination For Fault-Only-First Loads With Out-Of-Order Micro-Operations" Ser. No. 63/640,921, filed May 1, 2024, "Circular Queue Management With Nondestructive Speculative Reads" Ser. No. 63/641,045, filed May 1, 2024, "Direct Data Transfer With Cache Line Owner Assignment" Ser. No. 63/653,402, filed May 30, 2024, "Weight-Stationary Matrix Multiply Accelerator With Tightly Coupled L2 Cache" Ser. No. 63/679,192, filed Aug. 5, 2024, "Non-Blocking Vector Instruction Dispatch With Micro-Operations" Ser. No. 63/679,685, filed Aug. 6, 2024, "Atomic Compare And Swap Using Micro-Operations" Ser. No. 63/687,795, filed Aug. 28, 2024, "Atomic Updating Of Page Table Entry Status Bits" Ser. No. 63/690,822, filed Sep. 5, 2024, "Adaptive SOC Routing With Distributed Quality-Of-Service Agents" Ser. No. 63/691,351, filed Sep. 6, 2024, "Communications Protocol Conversion Over A Mesh Interconnect" Ser. No. 63/699, 245, filed Sep. 26, 2024, "Non-Blocking Unit Stride Vector Instruction Dispatch With Micro-Operations" Ser. No. 63/702,192, filed Oct. 2, 2024, and "Non-Blocking Vector Instruction Dispatch With Micro-Element Operations" Ser. No. 63/714,529, filed Oct. 31, 2024.

Each of the foregoing applications is hereby incorporated by reference in its entirety.

FIELD OF ART

This application relates generally to sharing data and more particularly to multi-cast snoop vectors within a mesh topology.

BACKGROUND

Electronic devices are widely used throughout society. Nearly all electronic devices are based on computer processors. The processors support many industries and applications. The processors support computers, laptops, tablets, and smartphones, and enable internet browsing, running applications, processing data, and communicating with others. Electronic devices have revolutionized how people work, play, communicate, and access information. The devices are embedded in smart devices, sensors, and appliances, have enabled connectivity and data processing, and have spurred growth of the Internet of Things. The devices collect, analyze, and transmit data, allowing automation, remote monitoring, and control of systems including smart homes, industrial automation, healthcare devices, vehicles, and more. Electronic devices enable communication and networking technologies, and are found in routers, switches, and modems, facilitating data transmission and network management. The devices are also used in telecommunications infrastructure, mobile network equipment, and wireless devices, enabling seamless connectivity and communication. The electronic devices, including processors, are present in a wide array of consumer electronics beyond computers and smartphones. They are found in televisions, gaming consoles, digital cameras, home appliances, audio systems, wearables, and more. The processors enable advanced features, user interfaces, and connectivity options in these consumer devices. Processor versatility, scalability, and computational power have transformed various industries, driving innovation and promoting technology advancements in numerous domains.

The main categories of processors include Complex Instruction Set Computer (CISC) types, and Reduced Instruction Set Computer (RISC) types. In a CISC processor, one instruction may execute several operations. The operations can include memory storage, loading from memory, an arithmetic operation, and so on. In contrast, in a RISC processor, the instruction sets tend to be smaller than the instruction sets of CISC processors, and may be executed in a pipelined manner, having pipeline stages that may include fetch, decode, and execute. Each of these pipeline stages may take one clock cycle, and thus, the pipelined operation can allow RISC processors to operate on more than one instruction per clock cycle.

Electronic devices based on integrated circuits (ICs) may be designed using a Hardware Description Language (HDL). Examples of such languages can include Verilog, VHDL, etc. HDLs enable the description of behavioral, register transfer, gate, and switch level logic. The languages provide designers with the ability to define system levels in detail. Behavioral level logic allows for a set of instructions executed sequentially, while register transfer level logic allows for the transfer of data between registers, driven by an explicit clock and gate level logic. The HDL can be used to create text models that describe or express logic circuits. The models can be processed by a synthesis program, followed by a simulation program, to test the logic design. Part of the process may include Register Level Transfer (RTL) abstractions that define the synthesizable data that is fed into a logic synthesis tool which in turn creates the gate-level abstraction of the design that is used for downstream implementation operations.

SUMMARY

In disclosed techniques, sharing data is accomplished using directional snoop vectors. The directional snoop vectors comprise multi-cast snoop vectors, where the multi-cast snoop vectors enable notification of other coherent tiles within the mesh topology that a first coherent tile is requesting to access shared storage. The other coherent tiles that are notified include tiles which access the same portion or block of the shared memory. The multi-cast snoop vectors support the sharing of data by enabling cache management. The cache management techniques are applied to a cache coherency block (CCB). A cache coherency block can include a plurality of shared local caches, shared intermediate caches, a shared system memory, and so on. Each coherent tile can include a shared local cache. The shared local cache can be used to store cache lines, blocks of cache lines, etc. The cache lines and blocks of cache lines can be loaded from memory such as a shared system memory. Each coherent tile can include one or more local processor cores that can process cache lines within the local cache based on operations performed by the processor associated with the coherent tile. If data is written or stored to the shared local cache, the data becomes "dirty". That is, the data in the local cache is different from the data in the shared memory system and other local caches. In order to maintain coherency across a cache coherency block, coherent tiles can monitor snoop operations issued by other hierarchical tiles with the M×N mesh topology. In embodiments, one or more coherent tiles within the M×N mesh include a memory control interface (MCI). In other embodiments, one or more coherent tiles with the M×N mesh include an I/O control interface (ICI).

Methods for sharing data are disclosed. A system-on-a-chip (SOC) can be accessed. The SOC can include a network-on-a-chip (NOC). The NOC can include an M×N mesh topology which can include a coherent tile at each point of the M×N mesh topology. Each coherent tile in the M×N mesh topology can include one or more local snoop vectors (LSVs). The first coherent tile within the M×N mesh topology can initiate a snoop operation. The first coherent tile can also generate a snoop vector. The snoop vector can indicate one or more other tiles within the M×N mesh topology to be notified of the snoop operation. The first coherent tile can create one or more directional snoop vectors (DSVs). The one or more DSVs can be created by logically combining the snoop vector with each of the one or more LSVs. An adjacent coherent tile to the first coherent tile can be selected. The adjacent coherent tile can be located in a cardinal direction from the first coherent tile. A first DSV can be chosen from the one or more DSVs. The choosing of the first DSV can be based on the cardinal direction. The first coherent tile can then send the snoop operation to the adjacent coherent tile that was selected. The first coherent tile can also send the first DSV that was chosen to the adjacent coherent tile.

A processor-implemented method for sharing data is disclosed comprising: accessing a system-on-a-chip (SOC), wherein the SOC includes a network-on-a-chip (NOC), wherein the NOC includes an M×N mesh topology, wherein the M×N mesh topology includes a coherent tile at each point of the M×N mesh topology, and wherein each coherent tile in the M×N mesh topology includes one or more local snoop vectors (LSVs); initiating, by a first coherent tile within the M×N mesh topology, a snoop operation; generating, by the first coherent tile, a snoop vector, wherein the snoop vector indicates one or more other tiles within the M×N mesh topology to be notified of the snoop operation; creating, by the first coherent tile, one or more directional snoop vectors (DSVs), wherein the creating includes logically combining the snoop vector that was generated with each of the one or more LSVs; selecting an adjacent coherent tile to the first coherent tile, wherein the adjacent coherent tile is located in a cardinal direction from the first coherent tile; choosing a first DSV from the one or more DSVs, wherein the choosing is based on the cardinal direction; and sending, by the first coherent tile, to the adjacent coherent tile that was selected, the snoop operation and the first DSV that was chosen. Some embodiments comprise generating, by the adjacent coherent tile, one or more second DSVs, wherein the generating includes logically combining the first DSV with each of one or more adjacent LSVs. In embodiments, the logically combining is based on an AND function. Some embodiments comprise identifying a second adjacent coherent tile, wherein the second adjacent coherent tile is located in a second cardinal direction from the adjacent coherent tile.

Various features, aspects, and advantages of various embodiments will become more apparent from the following further description.

BRIEF DESCRIPTION OF THE DRAWINGS

The following detailed description of certain embodiments may be understood by reference to the following figures wherein:

FIG. 8 shows local snoop vectors for a 4×4 mesh.

DETAILED DESCRIPTION

Figure 1:
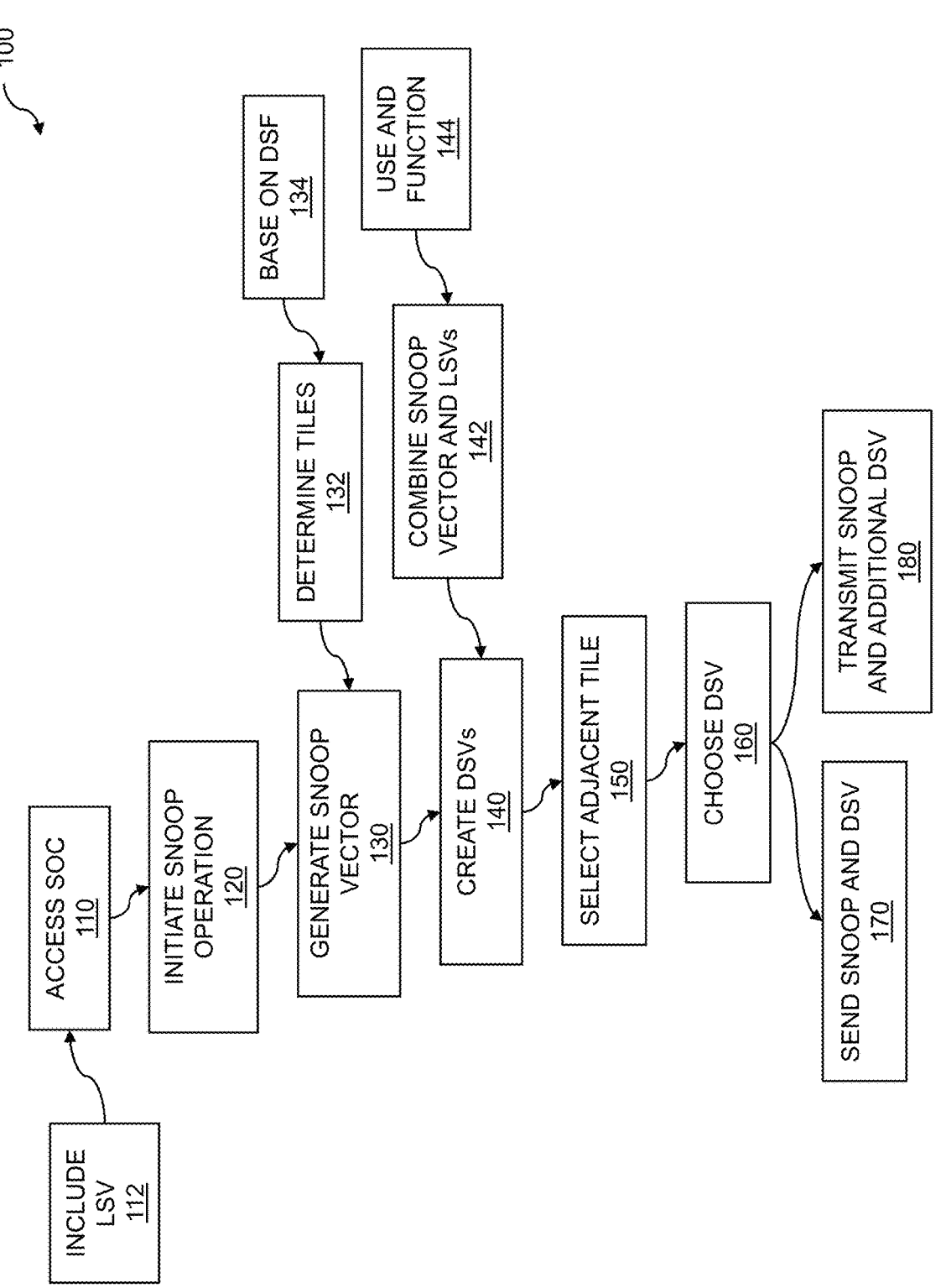
FIG. 1 is a flow diagram for multi-cast snoop vectors within a mesh topology.

Techniques for sharing data using multi-cast snoop vectors within a mesh topology are described. The sharing of data is based on using the multi-cast snoop vectors for cache management. The cache management can maintain cache line validity and cache coherency among one or more hierarchical tiles within an M×N mesh topology. The hierarchical tiles can comprise switching units. The switching units comprise one or more of mesh interface units (MIUs), mesh interface blocks (MIBs), cache coherency blocks (CCBs), coherency ordering agents (COAs), I/O control interfaces (ICIs), memory control interfaces (MCIs), and so on. The switching units can initiate a snoop operation in order to perform a memory access operation. Other coherent tiles or SUs within the mesh topology can be notified of the snoop operation. The notification is sent to SUs that access substantially similar portions or blocks of a shared cache memory. Snoop operations issued by the hierarchical tiles can be used to accomplish coherency within the M×N mesh, between cache memories and the shared common memory, etc.

The execution rate of data processing operations such as those associated with large datasets, large numbers of similar processing jobs, and so on can be increased by using one or more local or "cache" memories. A cache memory can be used to store a local copy of the data to be processed, thereby making the data easily accessible. A cache memory, which by design is typically smaller and has much lower access time than a shared common memory, can be coupled between the common memory and the coherent tiles. Further, each coherent tile can include a local cache, access to shared cache, etc., thereby adding storage in which copies of the data can be stored. As the data is processed, coherent tiles search first within the cache memory for an address containing the data. If the address is not present within the cache, then a "cache miss" occurs, and the data requested by the coherent cores can be obtained from an address within one or more higher levels of cache. If a cache miss occurs with the higher-level caches, then the requested data can be obtained from the address in the common memory. Data access by one or more coherent tiles using the cache memory is highly preferable to accessing common memory because of reduced latency associated with accessing the local cache memory as opposed to the remote common memory. The advantage of accessing data within the cache is further enhanced by the "locality of reference". The locality of reference indicates that code being executed tends to access a substantially similar set of memory addresses. The locality of reference can apply whether the memory addresses are located in the common memory, a higher-level cache, or the local cache memory. By loading the contents of a set of common memory addresses into the cache, the hierarchical tiles are, for a number of cycles, more likely to find the requested data within the cache.

The coherent tiles can obtain the requested data faster from the cache than if the requested data were obtained from the common memory. However, due to the smaller size of the cache with respect to the common memory, a cache miss can occur when the requested memory address is not present within the cache. One cache replacement technique that can be implemented loads a new block of data from the common memory into the local cache memory, where the new block contains one or more cache lines, and where a cache line can include the requested address. Thus, after the one or more cache lines are transferred to the cache, processing can again continue by accessing the faster cache rather than the slower common memory.

Snoop operations, which can be initiated based on memory access operations such as load operations or store operations, can be generated by coherent tiles such as switching units within a mesh topology. The first snoop operation can be used by a first coherent tile to notify one or more other coherent tiles within the mesh topology that a memory access is required. The snoop operation can be used to indicate that specific data is required by the load operation, or that a store operation will overwrite the current contents of the memory. One or more additional coherent tiles can be notified of the snoop operation using one or more communication techniques associated with the system-on-a-chip in which the mesh is placed. The communication techniques can include network-on-a-chip (NOC) techniques. The snoop operation can also be associated with one or more cache maintenance operations. The cache maintenance operations can be used to resynchronize the data between the common memory and one or more caches, one or more levels of cache, etc. The cache maintenance operations can be based on transferring cache lines between a cache and the shared common memory, or between the cache and compute coherency block caches. The transferring can be accomplished using a bus interface unit. The bus interface unit can provide access to the common memory. In addition to transfers from the common memory to caches and shared caches based on cache misses, cache transfers from the local caches and the shared caches to the common memory can also occur as a result of changes performed by the processor cores to the cache contents. The updated or "dirty" cache contents can be transferred to the common memory and can be copied to other caches in order to maintain coherency.

Individuals worldwide interact daily with a dizzying variety of electronic devices. These electronic devices can provide wide-ranging features such as large or small, stationary or portable, powerful or simple, or handheld, among others. Popular electronic devices include personal electronic devices such as computers, handheld electronic devices such as smartphones and tablets, and wearable electronic devices such as smartwatches. The electronic devices are also present in household devices including kitchen and cleaning appliances; personal, private, and mass transportation vehicles; and medical equipment; among many other familiar devices. Each of these devices is constructed with one type or often many types of integrated circuits or chips. The chips enable required, useful, and desirable device features by performing processing and control tasks. Electronic processors enable the devices to execute a typically vast range and number of applications. The applications include data processing; entertainment; messaging; patient monitoring; telephony; vehicle access, configuration, and operation control; etc. Additional electronic elements can be coupled to the processors in higher-function chips such as system-on-a-chip (SOC) devices. The SOCs enable feature and application execution. The additional elements typically include one or more of memories, radios, networking channels, peripherals, touch screens, battery and power controllers, and so on.

The contents of portions or blocks of a shared or common memory can be moved to local cache memory. The move to local cache memory enables a significant boost to processor performance. The local cache memory is smaller and faster, and is located closer to an element that processes data than is the shared memory. The element can include a coherent tile, where a coherent tile can include a processor, cache management elements, memory, and so on. The local cache can be shared between coherent tiles, enabling local data exchange between the tiles. The local cache can enable the sharing of data between and among coherent elements, where the elements can be located within an M×N mesh topology. The use of local cache memory is beneficial computationally because cache use takes advantage of "locality" of instructions and data typically present in application code as the code is executed. Coupling the cache memory to hierarchical tiles drastically reduces memory access times because of the adjacency of the instructions and the data. A hierarchical tile does not need to send a request across a common bus, across a crossbar switch, through buffers, and so on to access the instructions and data in a shared memory such as a shared system memory. Similarly, the coherent tile does not experience the delays associated with the shared bus, buffers, crossbar switch, etc.

A cache memory can be accessed by one, some, or all of a plurality of coherent tiles within the mesh topology. The access can be accomplished without having to access the slower common memory, thereby reducing access time and increasing processing speed. When a memory access operation is requested by a coherent tile, the tile issues a snoop operation. The snoop operation indicates that the initiating coherent tile intends to access a portion or block of shared memory. The snoop operation is used to notify other coherent tiles within the mesh that the contents of the shared memory are to be read or written. A snoop operation associated with a write operation includes an invalidating snoop operation. Specifically, the write operation invalidates the contents of the cache by making the contents different from the contents of the shared memory. Thus, the use of smaller cache memory dictates that new cache lines must be brought into the cache memory to replace no-longer-needed cache lines (called a cache miss, which requires a cache line fill), and that existing cache lines in the cache memory that are no longer synchronized (coherent) must be evicted and managed across all caches and the common memory. The evicting cache lines and filling cache lines is accomplished using cache management techniques.

A snoop operation, or snoop request, can be supported within the CCB. Snoop operations can look for cache line local caches in a shared hierarchical cache, and in shared common memory due to cache misses. The common memory can be coupled to the multiple CCB caches using Network-on-Chip (NoC) technology. The snoop operations can be used to determine whether data access operations being performed by more than one coherent tile accesses the same memory address in one or more caches or the shared common memory. Cache lines that are evicted from local caches can be stored in a queue such as an evict queue, prior to saving in shared common memory. The snoop operations can be used to determine whether cache lines within the evict queue can be committed to storage in the common memory without overwriting data already in the common memory that is required by another processor. The snoop requests can further monitor transactions such as data reads from and data writes to the common memory. While read operations leave data contained within a cache or the common memory unchanged, a write operation to a cache or to the common memory can change data. As a result, the copy of the data within a cache can become "incoherent" or "dirty" with respect to the common memory, either due to changes to the cache contents or changes to the common memory contents. The data changes, if not monitored and corrected using coherency management techniques, result in cache coherency problems. That is, new data can overwrite old data before the old data is used, old data can be read before new data can be written, etc.

FIG. 1 is a flow diagram for multi-cast snoop vectors within a mesh topology. The multi-cast snoop vectors can enable sharing data within a mesh topology. The mesh can be configured within a system-on-a-ship (SOC). The mesh can comprise a plurality of coherent tiles. The coherent tiles can communicate with their adjacent coherent tiles using communication techniques supported by the SOC. The communication techniques can include a network-on-a-chip (NOC) technique. A coherent tile can comprise a switching unit (SU). In embodiments, one or more coherent tiles include a memory control interface (MCI). In other embodiments, one or more coherent tiles with the M×N mesh include an I/O control interface (ICI). In further embodiments, one or more coherent tiles include one or more processors, a cache coherency block (CCB) and a coherency ordering agent (COA). The CCB and the COA can enable coherency among the coherent tiles and one or more memory systems. The memory systems can include one or more cache memories such as a shared cache memory, a shared system memory, and so on. The coherent tile or "mesh unit" can further include a last level cache, one or more mesh interface blocks, and so on. Note that for snoop handling of tiles where a CCB is not present, that is, there is no CCB in the tile, then the snoop will be handled by a multicast mechanism, which forwards the sending packet to the appropriate adjacent tiles (depending upon the destination of snoop) by passing it through that tile. Thus, the no-CCB case is handled by forwarding through a no-CCB tile.

Further elements associated with the SOC can include one or more of physical memory protection (PMP) elements, memory management (MMU) elements, level 1 (L1) caches such as instruction caches and data caches, level 2 (L2) caches, and the like. The multicore processor can further include a level 3 (L3) cache, test and debug support such as Joint Test Action Group (JTAG) elements, a platform-level interrupt controller (PLIC), an advanced core local interrupter (ACLINT), and so on. In addition to the elements just described, the multicore processor can include one or more interfaces. The interfaces can include one or more industry standard interfaces, interfaces specific to the multicore processor, and the like. In embodiments, the interfaces can include an Advanced extensible Interface (AXI™) such as AXI4™, an ARM™ Advanced extensible Interface (AXI™) Coherence Extensions (ACE™) interface, an Advanced Microcontroller Bus Architecture (AMBA™) Coherence Hub Interface (CHI™), etc. The interfaces can enable connection between the multicore processor and an interconnect. In embodiments, the interconnect can include an AXI™ interconnect. The interconnect can enable the multicore processor to access a variety of elements such as storage elements, communication elements, peripherals, memory mapped input/output elements, etc.

The flow 100 includes accessing a system-on-a-chip (SOC) 110. The SOC comprises a plurality of elements that enable the sharing of data. The SOC includes a network-on-a-chip (NOC), wherein the NOC includes an M×N mesh topology, wherein the M×N mesh topology includes a coherent tile at each point of the M×N mesh topology. The SOC can include further elements, such as local memory, memory interfaces, secondary memory interfaces, and so on, to enable the sharing of data. The SOC can further include elements such as communication components, graphics processors, network-on-a-chip (NOC) connectivity, etc. The SOC can be based on one or more chips, FPGAs, ASICs, etc. In embodiments, the processor cores associated with the SOC can include RISC-V™ processor cores. Memory such as local memory within the SOCs includes a local cache. The local cache can include a shared local cache. The shared local cache can be colocated with other elements associated with the SOC, can be accessible by a processor core within the SOC, and so on. The processor cores can implement special cache coherency operations. The cache coherency operations can include maintenance operations such as cache maintenance operations (CMOs). The cache coherency operations can include a cache line zeroing operation, a cache line cleaning operation, a cache line flushing operation, a cache line invalidating operation, and so on.

In the flow 100, each coherent tile in the M×N mesh topology includes one or more local snoop vectors (LSVs) 112. In embodiments, the one or more LSVs can include four LSVs. The four LSVs can be associated with directions from a first coherent tile to an adjacent coherent tile. In embodiments, the four LSVs can include a LSV for each of four cardinal directions from the first coherent tile. The LSVs can be based on the position of a given coherent tile within the mesh topology. The LSVs can include vectors comprising one or more ones and zeros. The LSVs can further include "null" or all zeros. The latter LSVs can occur for coherent tiles that are located in corners or at edges of the mesh topology. That is, if there is no tile in a cardinal direction from a coherent tile, then the LSV is set to all zeros. Similarly, if a tile does not have a CCB, the LSV is set to all zeros. An LSV can include a number of bits, where the number of bits associated with the vector can be equal to the number of tiles or switching units (SUs) associated with an MxN mesh. In a usage example, for an MxN mesh comprising 4×4 tiles, the number of bits associated with the LSV equals 4×4=16 bits. Each bit can represent a coherent tile or an SU within the mesh. For example, a first bit can be associated with a first tile 0, a second bit can be associated with a second tile 1, and so on. The bit associated with the first coherent tile can include a least significant bit (LSB), a most significant bit (MSB), etc. Each bit can be set to one or reset to 0. One or more bits within the LSV can be set to one, and the remaining bits can be reset to zero. If a bit is set to 1, the snoop operation can indicate that the coherent tile represented by the set bit should be notified about a snoop operation (discussed below). The coherent tile is notified because the tile that initiated the snoop operation and the tile to be notified can access a substantially similar location in memory. The location can include a single address within the memory, a memory block, a cache line, a cache line block, etc. The location can include one or more cache lines within shared storage. In embodiments, the one or more LSVs can be unique to the first coherent tile. Similarly, the one or more LSVs can be unique to each other tile within the MxN mesh of coherent tiles.

The flow 100 includes initiating, by a first coherent tile within the MxN mesh topology, a snoop operation 120. In embodiments, the coherent tile at each point of the MxN mesh topology comprises a switching unit (SU). Snoop operations can look for requested data or a cache line in one or more local caches, in a shared hierarchical cache, and in shared common memory. A snoop operation can be initiated due to cache misses. A snoop operation can also be initiated in order to notify other coherent tiles that the first coherent tile is requesting access. The access can include a load or read access, a store or write access, a read-modify-write access, etc. The common memory can be coupled to the multiple mesh topology of coherent tiles using Network-on-Chip (NoC) technology. In embodiments, the NOC can include a point-to-point packetized communication protocol. The snoop operations can be used to determine whether data access operations being performed by more than one coherent tile access the same memory address in one or more caches or the shared common memory. The snoop requests can further monitor transactions such as data reads from and data writes to the common memory. While read operations leave data contained within a cache or the common memory unchanged, a write operation to a cache or to the common memory can change data. As a result, the copy of the data within a cache can become "incoherent" or "dirty" with respect to the common memory, either due to changes to the cache contents or changes to the common memory contents. The data changes, if not monitored and corrected using coherency management techniques, result in cache coherency problems. The coherency problems can include memory access hazards. That is, new data can overwrite old data before the old data is used, old data can be read before new data can be written, etc.

The plurality of coherent tiles can implement special cache coherency operations. The cache coherency operations can be used to maintain data coherency across a block such as a cache coherency block. Cache coherency is necessary because copies of data in common memory such as a shared system memory can be loaded into one or more local caches. As data within the local caches is processed, changes can be made to the data, thereby introducing differences between the data in a local cache, local copies of data in other local caches, and data in the shared memory. The cache coherency operations can include a cache line zeroing operation, a cache line cleaning operation, a cache line flushing operation, and so on. In embodiments, the snoop operation can include an invalidating snoop operation. An invalidating snoop operation can be used to notify other coherent tiles that the first coherent tile will change and thereby invalidate cache contents. In other embodiments, the cache coherency operation can include a global snoop operation. A multicast snoop operation can notify one or more coherent tiles that a first coherent tile intends to perform a memory access operation such as a store or write operation. The notification alerts other coherent tiles that target a substantially similar address in storage.

The flow 100 includes generating 130, by the first coherent tile, a snoop vector. The snoop vector indicates one or more other tiles within the MxN mesh topology to be notified of the snoop operation. The snoop vector can include a number of bits. The bits can also be referred to as flow bits or flits. The number of bits associated with the snoop vector can be equal to the number of coherent tiles within the MxN array. One snoop vector bit is associated with one coherent tile within the mesh. In a usage example, the MxN array comprises a 4×4 array. A coherent tile within the 4×4 array generates a snoop vector that can include 4×4=16 bits. The value of each bit associated with the snoop vector can indicate whether the coherent tile associated with the snoop vector bit is to be notified of the snoop operation that was initiated by another coherent tile within the array. In a usage example, a bit value equal to one can indicate that the associated coherent tile is to be notified of the snoop operation, while a bit value equal to zero can indicate that the associated coherent tile need not be notified.

The flow 100 continues with determining 132 the one or more other tiles within the MxN mesh topology to be notified. The one or more tiles to be notified can be located anywhere within the MxN mesh. The tiles can include one or more adjacent tiles, one or more tiles beyond the adjacent tiles, and so on. The determining can be based on a table lookup, a repository, and so on. In the flow 100, the determining is based on a directory-based snoop filter (DSF) 134 within the first coherent tile. In embodiments, the DSF can include a cache with a plurality of "ways". In one or more embodiments, the DSF is an M-way associative set of tables that includes an index number, a valid bit, a presence vector, an owner ID field, and an owner valid field. The owner can include an identifying number, label, etc., associated with a coherent tile. In one or more embodiments, determining the owner can include obtaining a value in an owner ID field, and checking the validity in a corresponding owner valid field. In embodiments, the owner ID field is included in the presence vector. In embodiments, the presence vector within each DSF associated with cache coherency block can store a range of addresses. Thus, in embodiments, coherent tiles need only look in a single DSF for a desired memory address. The snoop vector can signal to coherent tiles that the cache ownership may be changing. In response to receiving the snoop vector (discussed below), the coherent tiles can write any information in the "dirty" state and discontinue use of the cache (or locations within the cache) that are invalidated. In the context of cache memory, a dirty cache entry refers to a cache line or block that has been modified or written by a coherent tile, but has not yet been updated in the main memory. When a cache line is written, the corresponding entry in the cache becomes "dirty" because it contains data that is different from the corresponding data in the main memory. Dirty cache entries can occur due to the write-back policies used in some cache coherency protocols. In some embodiments, the write-back policy is such that modifications made by a coherent tile are first stored in the cache, and the updated data is only written back to the main memory when the cache line needs to be replaced or when a cache coherency operation requires it.

The flow 100 includes creating 140, by the first coherent tile, one or more directional snoop vectors (DSVs). The coherent tiles discussed above are organized in an M×N mesh topology. A coherent tile is positioned at each point of the M×N mesh topology. The coherent tiles can be numbered (discussed below) or otherwise labeled for identification. A coherent tile can communicate with adjacent coherent tiles that are located at cardinal directions from the coherent tile. In a usage example, for a first coherent tile located within the interior of the mesh, coherent tiles that are positioned adjacent to the first coherent tile are located in each cardinal direction. The cardinal directions include east, west, north, and south directions from the first tile. Thus, for an interior tile, up to four DSVs can be created. In a second usage example, for a coherent tile located at an edge, such as an east, west, north, or south edge of the mesh, fewer than four DSVs can be created. In a usage example, for a coherent tile located at the upper left corner of the mesh, there are no adjacent tiles to the north nor to the west of the coherent tile. Thus, only two DSVs need be created. In the flow 100, the creating includes logically combining 142 the snoop vector that was generated with each of the one or more LSVs. The logically combining can be based on a logic function such as a logic NAND, NOR, XOR, XNOR, and so on. In the flow 100, the logically combining is based on an AND function 144. Any of the logic functions can be based on a bitwise logic function. In embodiments, the AND function can include a bitwise AND function.

The flow 100 includes selecting 150 a coherent tile adjacent to the first coherent tile, wherein the adjacent coherent tile is located in a cardinal direction from the first coherent tile. The selecting can be based on whether the adjacent coherent tile is to be notified of the snoop that was initiated by a coherent tile. The selecting can also be based on a further tile that is accessible through the adjacent coherent tile. In a usage example, a coherent tile to the east of the first coherent tile is to be notified of the snoop operation. The coherent tile to the east of the first tile can be selected as the adjacent coherent tile. The adjacent tile to the east of the first tile can also be selected because tiles located beyond the adjacent tile to the east, such as tiles further to the east, to the north, or to the south, may require notification of the snoop operation. In embodiments, the selecting of a coherent tile adjacent in a cardinal direction from the first coherent tile can be based on a priority. In embodiments, the cardinal direction priority can be east/west, then north/south. Discussed in detail below, in embodiments, the selecting can include a second adjacent coherent tile. The second adjacent tile can include a coherent tile adjacent to the adjacent tile. That is, the second adjacent tile can include a coherent tile that is beyond the coherent tile from the first coherent tile. In embodiments, the second adjacent coherent tile does not include the first adjacent coherent tile. Preventing the first coherent tile from being selected as the second adjacent tile prevents "snoop storms", in which a snoop initiated by the first coherent tile is not returned to the first coherent tile.

The flow 100 includes choosing a first DSV 160 from the one or more DSVs, wherein the choosing is based on the cardinal direction. Note that one or more DSVs can be created based on the cardinal directions from a first coherent tile, and on the priority of the cardinal directions. Based on the cardinal direction priority, the first DSV can be a DSV associated with east, if available. If the DSV associated with east is not available, then the DSV associated with west, if available, can be chosen. Similar choosing can occur for a first DSV associated with north, and a first DSV associated with south.

The flow 100 includes sending 170, by the first coherent tile, to the adjacent coherent tile that was selected, the snoop operation and the first DSV that was chosen. The sending can be accomplished using a variety of techniques appropriate to SOC communication. In embodiments, the sending is accomplished using network-on-a-chip (NOC) techniques. Techniques for sending the snoop operation and the first DSV can be accomplished using a variety of communication techniques available to the NOC. In embodiments, the sending the snoop operation and the first DSV can be accomplished using the point-to-point packetized communication protocol included in the NOC. Discussed previously, a second adjacent coherent tile can be identified. Embodiments can include identifying a second adjacent coherent tile, wherein the second adjacent coherent tile is located in a second cardinal direction from the adjacent coherent tile. The first adjacent coherent tile can generate DSVs by logically combining the DSV adjacent to the tile received from the first tile with LSVs associated with the first adjacent tile. In embodiments, the logically combining comprises a logical AND function. The snoop operation and a DSV generated by the adjacent coherent tile can be set to the second adjacent tile. In embodiments, the choosing includes an additional DSV. The additional DSV is associated with the cardinal direction between the adjacent coherent tile and the second coherent tile. The flow 100 further includes transmitting 180, by the first coherent tile, the snoop operation and the additional DSV to the second adjacent coherent tile. The steps of creating DSVs, selecting a further adjacent coherent tile, choosing the DSV associated with the selected further adjacent coherent tile, and sending the snoop operation and the chosen DSV can continue. The continuing enables communication of the snoop operation to the coherent tiles in the M×N mesh that require notification of a memory access operation.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors. Various embodiments of the flow 100, or portions thereof, can be included on a semiconductor chip and implemented in special purpose logic, programmable logic, and so on.

Figure 2:
FIG. 2 is a flow diagram for generating a second directional snoop vector (DSV).
Figure 2:
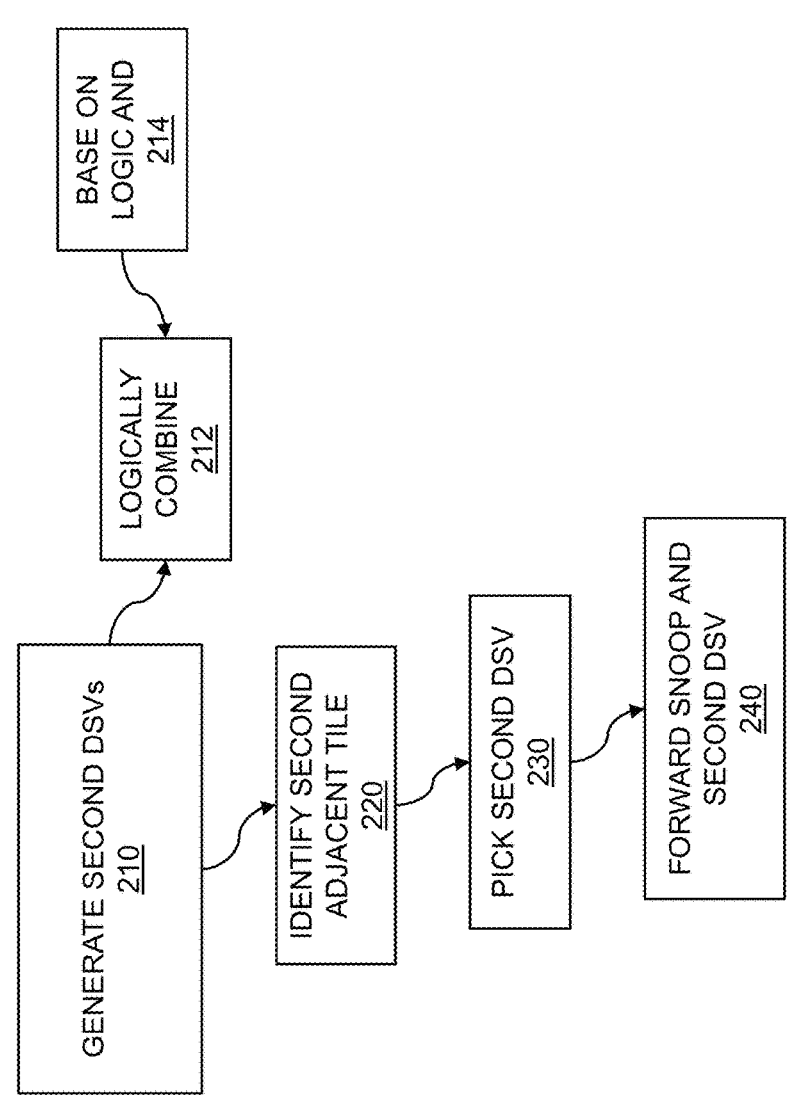

FIG. 2 is a flow diagram for generating a second directional snoop vector (DSV). In order for a snoop vector to be propagated or sent from a coherent tile that initiates a snoop operation to other tiles within an M×N mesh, a multi-cast technique, by which the snoop operation and a first directional snoop vector can be sent to a first adjacent coherent tile, is described. The adjacent coherent tile can create or generate an additional DSV and can send the snoop operation and the additional DSV on to a further coherent tile. The additional DSV is generated from the first DSV. The technique of generating additional DSVs and sending the additional DSV and the snoop operation on to further coherent tiles accomplishes sending the snoop operation to all coherent tiles within the mesh that require notification that the first coherent tile has generated a snoop operation. Generating the second and additional directional snoop vectors enables multi-cast snoop vectors within a mesh topology. A system-on-a-chip (SOC) is accessed, wherein the SOC includes a network-on-a-chip (NOC), wherein the NOC includes an M×N mesh topology, wherein the M×N mesh topology includes a coherent tile at each point of the M×N mesh topology, and wherein each coherent tile in the M×N mesh topology includes one or more local snoop vectors (LSVs). A snoop operation is initiated by a first coherent tile within the M×N mesh topology. A snoop vector is generated by the first coherent tile, wherein the snoop vector indicates one or more other tiles within the M×N mesh topology to be notified of the snoop operation. One or more directional snoop vectors (DSVs) are created by the first coherent tile, wherein the creating includes logically combining the snoop vector that was generated with each of the one or more LSVs. A coherent tile adjacent to the first coherent tile is selected, wherein the adjacent coherent tile is located in a cardinal direction from the first coherent tile. A first DSV is chosen from the one or more DSVs, wherein the choosing is based on the cardinal direction. The snoop operation and the first DSV that was chosen are sent by the first coherent tile to the adjacent coherent tile that was selected.

The flow 200 includes generating 210, by the adjacent coherent tile, one or more second DSVs. Recall that the first DSV is received from a first coherent tile. The adjacent LSVs can include one or more local snoop vectors, where each LSV is associated with a cardinal direction. In embodiments, the cardinal directions can include east, west, north, and south. The cardinal directions can be prioritized. In the flow 200, the generating includes logically combining 212 the first DSV with each of the one or more adjacent LSVs. The logically combining the first DSV with the one or more adjacent LSVs generates one or more LSVs. The number of DSVs that can be generated can be based on a position of the adjacent coherent tile within the mesh. In a usage example, consider a coherent tile in the upper lefthand corner, or SU 0, of the mesh. Adjacent tiles located in cardinal directions from SU 0 are located to the east and to the south. There are no adjacent tiles to the north nor to the west. Thus, only two local snoop vectors, one each for east and south, are needed. In a second usage example, consider a coherent tile positioned at the interior of the mesh. The adjacent tiles to the interior tile are located in all four cardinal directions, east, west, north, and south. Thus, four local snoop vectors, one for each cardinal direction, are needed. In the flow 200, the logically combining can be based on an AND function 214. The AND function can include a bitwise AND of each bit of the DSV from the first coherent tile with each LSV of the adjacent tile.

The flow 200 includes identifying 220 a second adjacent coherent tile, wherein the second adjacent coherent tile is located in a second cardinal direction from the adjacent coherent tile. The second cardinal direction can include an east, west, north, or south direction. Not all cardinal directions may be available, such as for a coherent tile located at an edge of the M×N mesh. Recall that the selecting the first coherent tile was based on a cardinal direction priority. The identifying the second adjacent coherent tile can also be based on cardinal direction priority. In embodiments, the cardinal direction priority is east/west, then north/south. Other restrictions to identifying a second adjacent coherent tile can also apply. In embodiments, the second adjacent coherent tile is not the first coherent tile. The flow 200 further includes picking a second DSV 230 from the one or more second DSVs, wherein the picking is based on the second cardinal direction. The picking the second DSV is further based on the available second adjacent coherent tiles based on second coherent tile position within the mesh, not returning to the first coherent tile, cardinal direction priority, etc.

The flow 200 further includes forwarding 240, by the adjacent coherent tile, to the second adjacent coherent tile that was identified, the snoop operation and the second DSV that was picked. The forwarding can be accomplished using a variety of communication techniques. In embodiments, the forwarding is accomplished using the network-on-a-chip (NOC) included in the system-on-a-chip (SOC).

Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors. Various embodiments of the flow 200, or portions thereof, can be included on a semiconductor chip and implemented in special purpose logic, programmable logic, and so on.

Figure 3:
FIG. 3 is a block diagram of a multicore processor.
Figure 3:
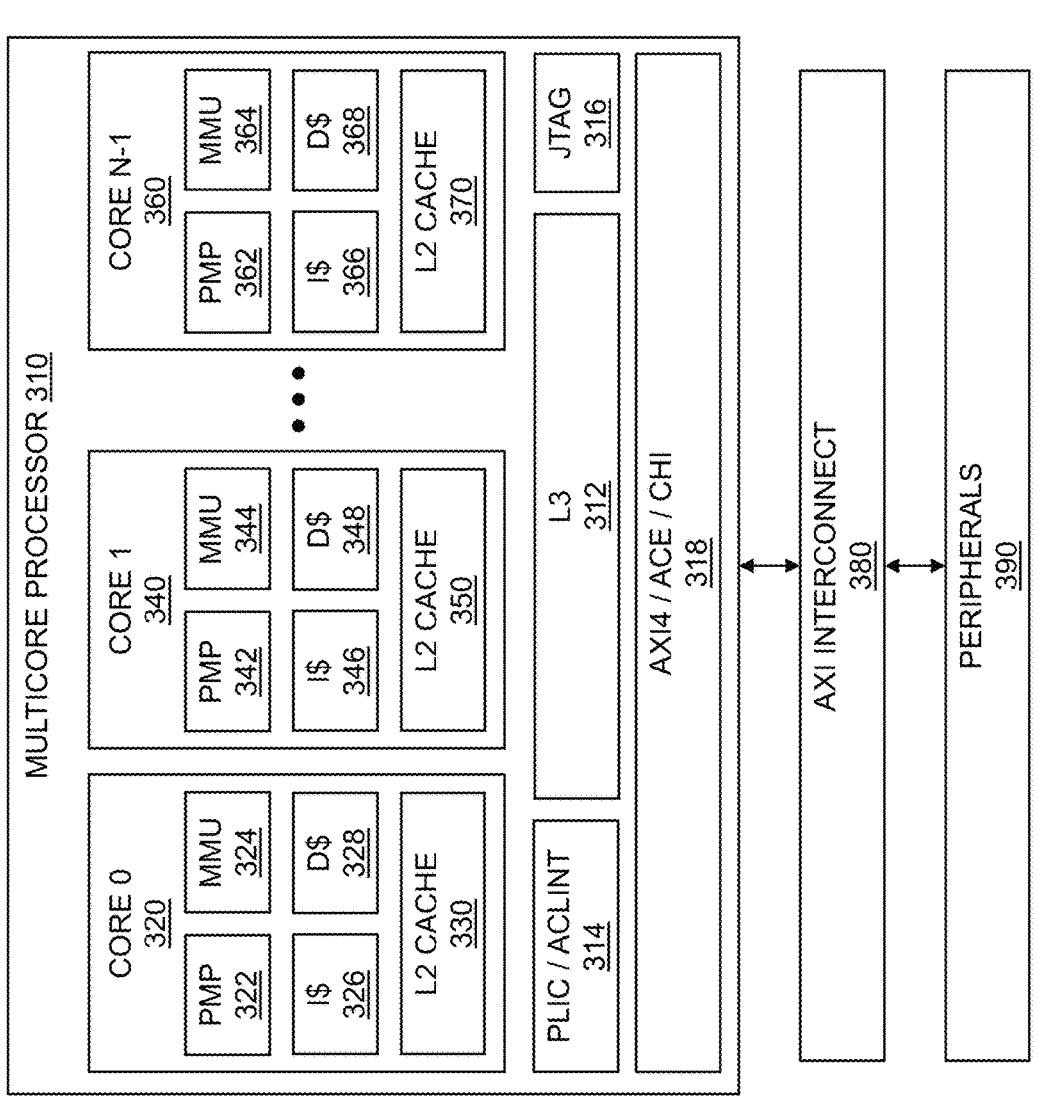

FIG. 3 is a block diagram of a multicore processor. A multicore processor can comprise two or more processor cores, where the processor cores can include homogeneous processor cores or heterogeneous processor cores. The multicore processor can be based on a RISC-V™ processor. The multicore processor can include a variety of elements. The elements can include a plurality of processor cores, one or more caches, memory protection and management units, local storage, and so on. The elements of the multicore processor can further include one or more of a private cache, a test interface such as a Joint Test Action Group (JTAG) test interface, one or more interfaces to a network such as a network-on-chip (NoC), a coupling to a common memory structure, peripherals, and the like. The multicore processor is enabled by multi-cast snoop vectors within a mesh topology. A system-on-a-chip (SOC) is accessed, wherein the SOC includes a network-on-a-chip (NOC), wherein the NOC includes an M×N mesh topology, wherein the M×N mesh topology includes a coherent tile at each point of the M×N mesh topology, and wherein each coherent tile in the M×N mesh topology includes one or more local snoop vectors (LSVs). A snoop operation is initiated by a first coherent tile within the M×N mesh topology. A snoop vector is generated by the first coherent tile, wherein the snoop vector indicates one or more other tiles within the M×N mesh topology to be notified of the snoop operation. One or more directional snoop vectors (DSVs) are created by the first coherent tile, wherein the creating includes logically combining the snoop vector that was generated with each of the one or more LSVs. An adjacent coherent tile to the first coherent tile is selected, wherein the adjacent coherent tile is located in a cardinal direction from the first coherent tile. A first DSV is chosen from the one or more DSVs, wherein the choosing is based on the cardinal direction. The snoop operation and the first DSV that was chosen are sent by the first coherent tile to the adjacent coherent tile that was selected.

The block diagram 300 can include a multicore processor 310. The multicore processor can comprise two or more processors, where the two or more processors can include homogeneous processors, heterogeneous processors, etc. In the block diagram, the multicore processor can include N processor cores such as core 0 320, core 1 340, core N−1 360, and so on. Each processor can comprise one or more elements. In embodiments, each core, including cores 0 through core N−1, can include a physical memory protection (PMP) element, such as PMP 322 for core 0; PMP 342 for core 1, and PMP 362 for core N−1. In a processor architecture such as the RISC-V™ architecture, a PMP can enable processor firmware to specify one or more regions of physical memory such as cache memory of the common memory, and to control permissions to access the regions of physical memory. The cores can include a memory management unit (MMU) such as MMU 324 for core 0, MMU 344 for core 1, and MMU 364 for core N−1. The memory management units can translate virtual addresses used by software running on the cores to physical memory addresses with caches, the common memory system, etc.

The processor cores associated with the multicore processor 310 can include caches such as instruction caches and data caches. The caches, which can comprise level 1 (L1) caches, can include an amount of storage such as 16 KB, 32 KB, and so on. The caches can include an instruction cache I\$ 326 and a data cache D\$ 328 associated with core 0; an instruction cache I\$ 346 and a data cache D\$ 348 associated with core 1; and an instruction cache I\$ 366 and a data cache D\$ 368 associated with core N−1. In addition to the level 1 instruction and data caches, each core can include a level 2 (L2) cache. The level 2 caches can include L2 cache 330 associated with core 0, L2 cache 350 associated with core 1, and L2 cache 370 associated with core N−1. Each core associated with multicore processor 310, such as core 0 320 and its associated cache(s), elements, and units, can be "coherency managed" by a CCB. Each CCB can communicate with other CCBs that comprise the coherency domain. The cores associated with the multicore processor 310 can include further components or elements. The further elements can include a level 3 (L3) cache 312. The level 3 cache, which can be larger than the level 1 instruction and data caches, and the level 2 caches associated with each core, can be shared among all of the cores. The further elements can be shared among the cores. The further elements can be unique to a given CCB or can be shared among various CCBs. In embodiments, the further elements can include a platform level interrupt controller (PLIC) 314. The platform-level interrupt controller can support interrupt priorities, where the interrupt priorities can be assigned to each interrupt source. The PLIC source can be assigned a priority by writing a priority value to a memory-mapped priority register associated with the interrupt source. The PLIC can be associated with an advanced core local interrupter (ACLINT). The ACLINT can support memory-mapped devices that can provide inter-processor functionalities such as interrupt and timer functionalities. The inter-processor interrupt and timer functionalities can be provided for each processor. The further elements can include a joint test action group (JTAG) element 316. The JTAG can provide a boundary within the cores of the multicore processor. The JTAG can enable fault information to a high precision. The high-precision fault information can be critical to rapid fault detection and repair.

The multicore processor 310 can include one or more interface elements 318. The interface elements can support standard processor interfaces such as an Advanced extensible Interface (AXI™) such as AXI4™, an ARM™ Advanced extensible Interface (AXI™) Coherence Extensions (ACE™) interface, an Advanced Microcontroller Bus Architecture (AMBA™) Coherence Hub Interface (CHI™), etc. In the block diagram 300, the interface elements can be coupled to the interconnect. The interconnect can include a bus, a network, and so on. The interconnect can include an AXI™ interconnect 380. In embodiments, the network can include network-on-chip functionality. The AXI™ interconnect can be used to connect memory-mapped "master" or boss devices to one or more "slave" or worker devices. In the block diagram 300, the AXI interconnect can provide connectivity between the multicore processor 310 and one or more peripherals 390. The one or more peripherals can include storage devices, networking devices, and so on. The peripherals can enable communication using the AXI™ interconnect by supporting standards such as AMBA™ version 4, among other standards.

Figure 4:
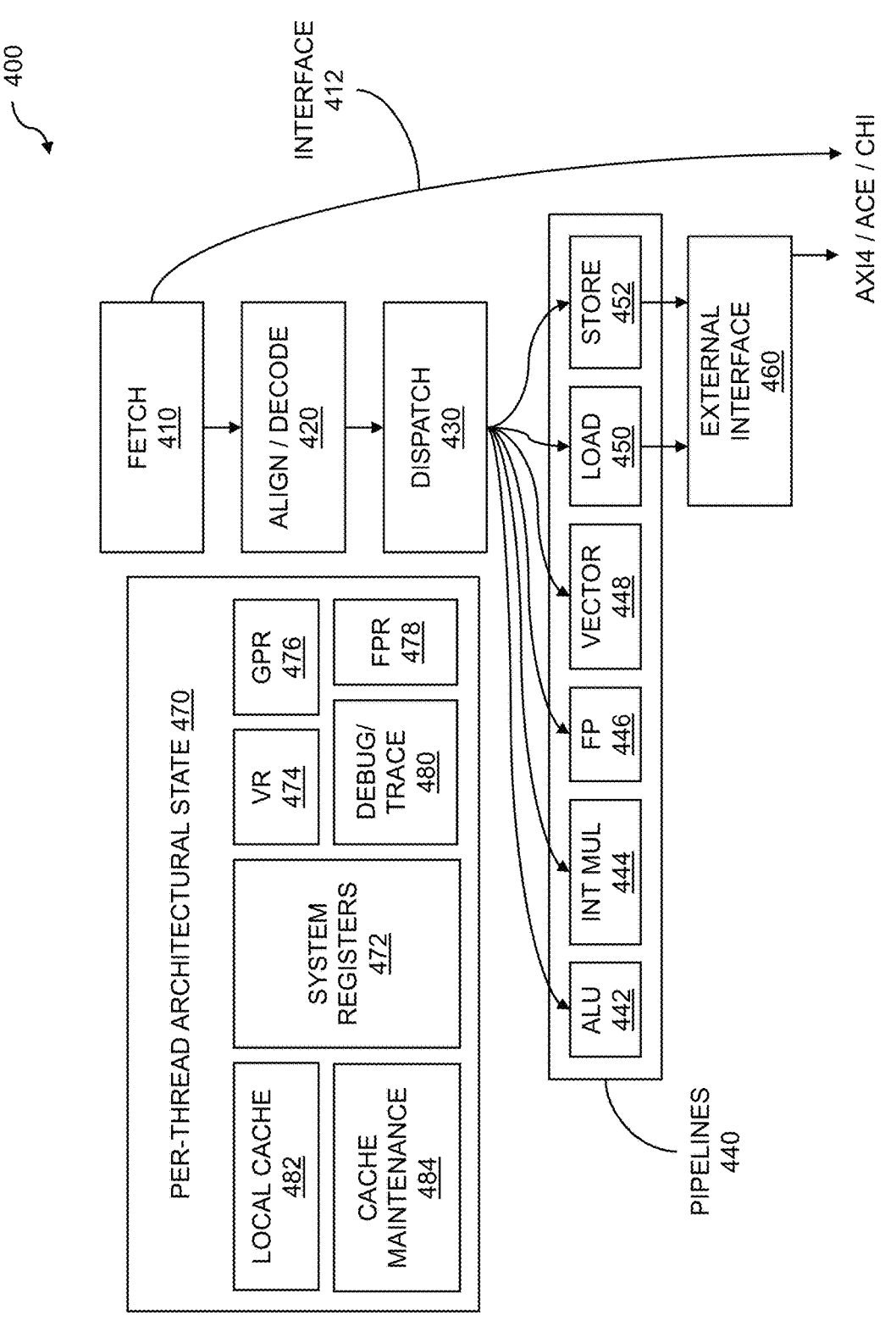
FIG. 4 is a block diagram of a pipeline.

FIG. 4 is a block diagram of a pipeline. One or more pipelines associated with a processor architecture can be used to greatly enhance processing throughput. The processor architecture, such as a multicore processor architecture, can be associated with one or more processor cores, multiprocessors, storage elements, and so on. The processing throughput can be increased by executing multiple operations in parallel. The use of one or more pipelines supports multi-cast snoop vectors within a mesh topology. A system-on-a-chip (SOC) is accessed, wherein the SOC includes a network-on-a-chip (NOC), wherein the NOC includes an M×N mesh topology, wherein the M×N mesh topology includes a coherent tile at each point of the M×N mesh topology, and wherein each coherent tile in the M×N mesh topology includes one or more local snoop vectors (LSVs). A snoop operation is initiated by a first coherent tile within the M×N mesh topology. A snoop vector is generated by the first coherent tile, wherein the snoop vector indicates one or more other tiles within the M×N mesh topology to be notified of the snoop operation. One or more directional snoop vectors (DSVs) are created by the first coherent tile, wherein the creating includes logically combining the snoop vector that was generated with each of the one or more LSVs. An adjacent coherent tile to the first coherent tile is selected, wherein the adjacent coherent tile is located in a cardinal direction from the first coherent tile. A first DSV is chosen from the one or more DSVs, wherein the choosing is based on the cardinal direction. The snoop operation and the first DSV that was chosen are sent by the first coherent tile to the adjacent coherent tile that was selected.

The block diagram 400 shows a pipeline such as a processor core pipeline. The blocks within the block diagram can be configurable in order to provide varying processing levels. The varying processing levels can be based on processing speed, bit lengths, and so on. The block diagram 400 can include a fetch block 410. The fetch block can read a number of bytes from a cache such as an instruction cache (not shown). The number of bytes that are read can include 16 bytes, 32 bytes, 64 bytes, and so on. The fetch block can include branch prediction techniques, where the choice of branch prediction technique can enable various branch predictor configurations. The fetch block can access memory through an interface 412. The interface can include a standard interface such as one or more industry standard interfaces. The interfaces can include an Advanced extensible Interface (AXI™), an ARM™ Advanced extensible Interface (AXI™) Coherence Extensions (ACE™) interface, an Advanced Microcontroller Bus Architecture (AMBA™) Coherence Hub Interface (CHI™), etc.

The block diagram 400 includes an align and decode block 420. Operations such as data processing operations can be provided to the align and decode block by the fetch block. The align and decode block can partition a stream of operations provided by the fetch block. The stream of operations can include operations of differing bit lengths, such as 16 bits, 32 bits, and so on. The align and decode block can partition the fetch stream data into individual operations. The operations can be decoded by the align and decode block to generate decode packets. The decode packets can be used in the pipeline to manage execution of operations. The block diagram 400 can include a dispatch block 430. The dispatch block can receive decoded instruction packets from the align and decode block. The decoded instruction packets can be used to control a pipeline 440, where the pipeline can include an in-order pipeline, an out-of-order (OoO) pipeline, etc. For the case of an in-order pipeline, the dispatch block can maintain a register "scoreboard" and can forward instruction packets to various processors for execution. For the case of an out-of-order pipeline, the dispatch block can perform additional operations from the instruction set. Instructions can be issued by the dispatch block to one or more execution units. A pipeline can be associated with the one or more execution units. The pipelines associated with the execution units can include processor cores, arithmetic logic unit (ALU) pipelines 442, integer multiplier pipelines 444, floating-point unit (FPU) pipelines 446, vector unit (VU) pipelines 448, and so on. The dispatch unit can further dispatch instructions to pipelines that can include load pipelines 450, and store pipelines 452. The load pipelines and the store pipelines can access storage such as the common memory using an external interface 460. The external interface can be based on one or more interface standards such as the Advanced extensible Interface (AXI™). Following execution of the instructions, further instructions can update the register state. Other operations can be performed based on actions that can be associated with a particular architecture. The actions that can be performed can include executing instructions to update the system register state, to trigger one or more exceptions, and so on.

In embodiments, the plurality of processors can be configured to support multi-threading. The system block diagram can include a per-thread architectural state block 470. The inclusion of the per-thread architectural state can be based on a configuration or architecture that can support multi-threading. In embodiments, thread selection logic can be included in the fetch and dispatch blocks discussed above. Further, when an architecture supports an out-of-order (OoO) pipeline, then a retire component (not shown) can also include thread selection logic. The per-thread architectural state can include system registers 472. The system registers can be associated with individual processors, a system comprising multiple processors, and so on. The system registers can include exception and interrupt components, counters, etc. The per-thread architectural state can include further registers such as vector registers (VR) 474, general purpose registers (GPR) 476, and floating-point registers 478. These registers can be used for vector operations, general purpose (e.g., integer) operations, and floating-point operations, respectively. The per-thread architectural state can include a debug and trace block 480. The debug and trace block can enable debug and trace operations to support code development, troubleshooting, and so on. In embodiments, an external debugger can communicate with a processor through a debugging interface such as a joint test action group (JTAG) interface. The per-thread architectural state can include local cache state 482. The architectural state can include one or more states associated with a local cache, such as a local cache coupled to a grouping of two or more processors. The local cache state can include clean or dirty, zeroed, flushed, invalid, and so on. The per-thread architectural state can include a cache maintenance state 484. The cache maintenance state can include maintenance needed, maintenance pending, and maintenance complete states, etc.

Figure 5:
FIG. 5 is an example 4×4 mesh with switching units.
Figure 5:
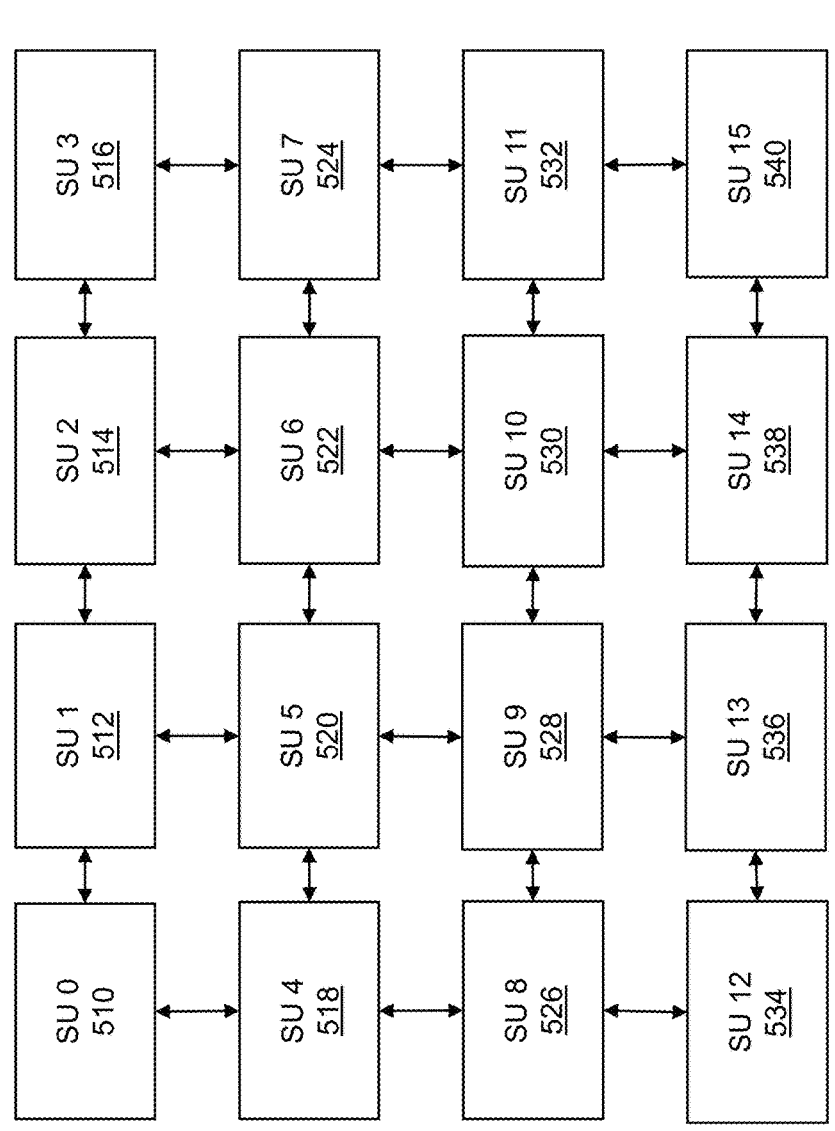

FIG. 5 is an example 4×4 mesh with switching units. Discussed previously and throughout, snoop vectors such as multi-cast snoop vectors can be used to manage access to storage. The storage can include cache storage that is shared by tiles associated with a system-on-a-chip (SOC). A snoop vector can be used to alert one or more other tiles that a tile is requesting access to an address in the shared cache storage. The access request can include a read request, a write request, a read-modify-write request, and so on. The tiles can be configured within the SOC using a mesh topology. The tiles can include switching units, where the switching units can route snoop vectors to one or more tiles within the mesh topology that access the same shared storage address. The mesh topology is enabled by multi-cast snoop vectors. A system-on-a-chip (SOC) is accessed, wherein the SOC includes a network-on-a-chip (NOC), wherein the NOC includes an M×N mesh topology, wherein the M×N mesh topology includes a coherent tile at each point of the M×N mesh topology, and wherein each coherent tile in the M×N mesh topology includes one or more local snoop vectors (LSVs). A snoop operation is initiated by a first coherent tile within the M×N mesh topology. A snoop vector is generated by the first coherent tile, wherein the snoop vector indicates one or more other tiles within the M×N mesh topology to be notified of the snoop operation. One or more directional snoop vectors (DSVs) are created by the first coherent tile, wherein the creating includes logically combining the snoop vector that was generated with each of the one or more LSVs. An adjacent coherent tile to the first coherent tile is selected, wherein the adjacent coherent tile is located in a cardinal direction from the first coherent tile. A first DSV is chosen from the one or more DSVs, wherein the choosing is based on the cardinal direction. The snoop operation and the first DSV that was chosen are sent by the first coherent tile to the adjacent coherent tile that was selected.

Switching units can be configured in an M×N mesh topology. The FIG. 500 shows an example 4×4 mesh. The switching units within the mesh can include switching units SU 0 510, SU 1 512, SU 2 514, SU 3 516, SU 4 518, SU 5 520, SU 6 522, SU 7 524, SU 8 526, SU 9 528, SU 10 530, SU 11 532, SU 12 534, SU 13 536, SU 14 538, and SU 15 540. In embodiments, a coherent tile at each point of the M×N mesh topology can include a switching unit (SU). A switching unit, which can also be referred to as a mesh switch unit, can include one or more of a memory controller interface (MCI), an input/output (I/O) mesh interface (IMI), and so on. Each switching unit can include a plurality of ports. The ports can include local ports, directional ports, and the like. The ports can be used for communication with other switching units within the mesh. Each switching unit can be in communication with nearest-neighbor SUs within the matrix. The nearest neighbor SUs within the mesh topology can be in one or more cardinal directions. The cardinal directions can include north, south, east, and west directions. Communication with a nearest neighbor SU can be based on a cardinal direction priority. In embodiments, the cardinal direction priority can be east/west, then north/south. Noted above, the communication with nearest-neighbor SUs can be accomplished using a network-on-chip (NOC). The network-on-chip can be based on techniques including router-based packet switching.

The communication between switching units is based on snoop vectors (see examples below in subsequent figures). The snoop vectors can include local snoop vectors (LSVs) associated with each coherent or mesh tile and directional snoop vectors (DSVs). A local snoop vector is generated by a first coherent tile. The local snoop vector indicates one or more tiles within the mesh topology to be notified of a snoop operation. The snoop operation can indicate a storage address such as a storage address associated with a shared cache, shared memory, etc. The snoop operation can be associated with a read operation, a write operation, a read-modify-write operation, and so on. The first coherent tile creates one or more directional snoop vectors (DSVs). The creating the one or more DSVs includes logically combining the generated snoop vector with one or more LSVs. In embodiments, the logically combining can include a logical AND function. The communicating between switching units is further based on selecting an adjacent switching unit or coherent tile. The adjacent SU is located in a cardinal direction relative to the first SU. The cardinal direction can include north, south, east, or west. In embodiments, the one or more LSVs can be based on a cardinal direction priority. The cardinal direction priority can be used to select which cardinal direction can be chosen for communicating a snoop operation. In embodiments, the cardinal direction priority can be east/west, then north/south.

Figure 6A:
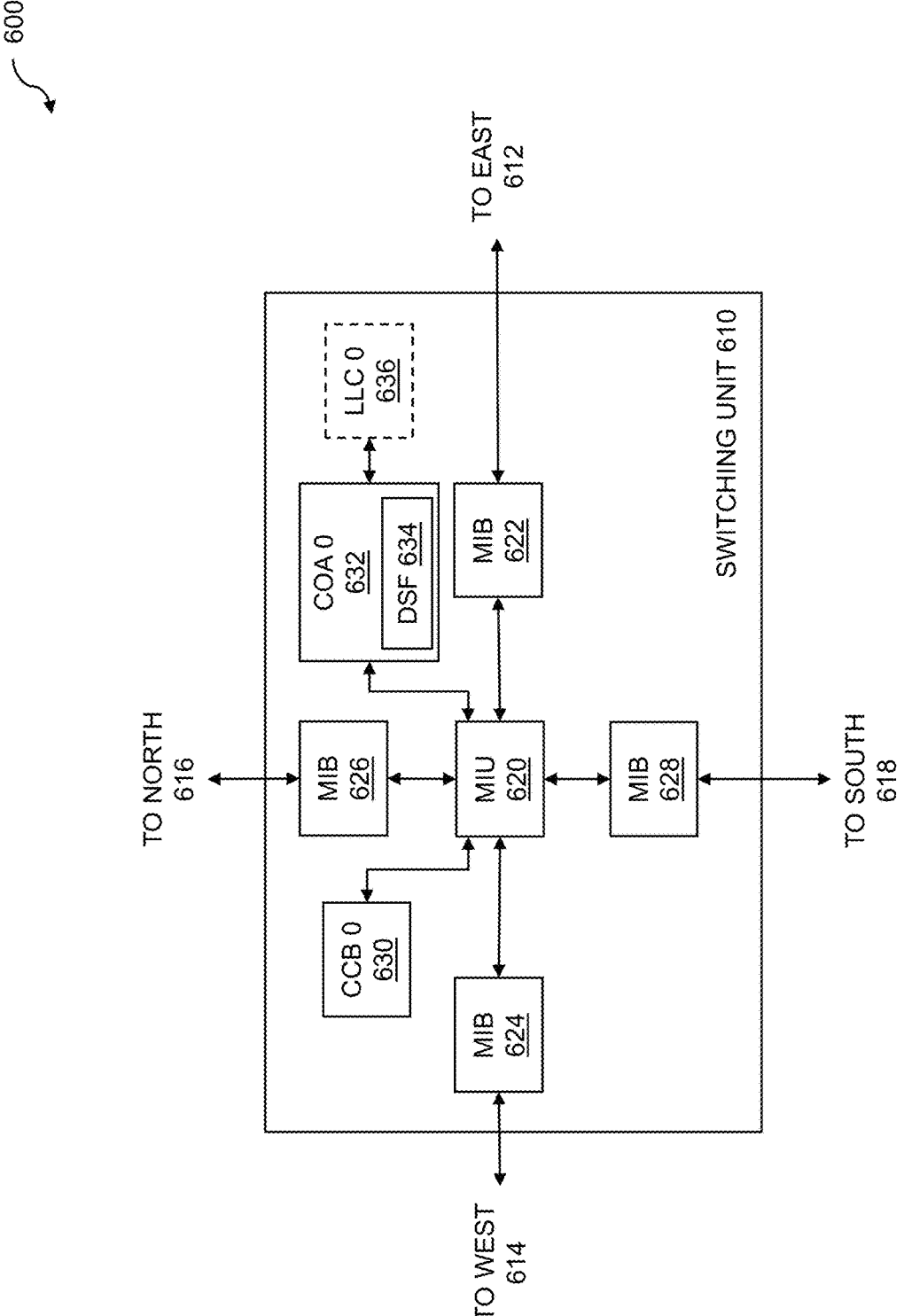
FIG. 6A is a first block diagram of a switching unit (SU).

FIG. 6A is a first block diagram of a switching unit (SU). Discussed previously and throughout, a plurality of switching units can be configured in an M×N topology. The switching units can include one or more of a memory controller interface, an I/O mesh interface, and so on. A SU or tile can further include elements for managing coherency across the M×N topology. The various elements of a switching unit support multi-cast snoop vectors within a mesh topology. A system-on-a-chip (SOC) is accessed, wherein the SOC includes a network-on-a-chip (NOC), wherein the NOC includes an M×N mesh topology, wherein the M×N mesh topology includes a coherent tile at each point of the M×N mesh topology, and wherein each coherent tile in the M×N mesh topology includes one or more local snoop vectors (LSVs). A snoop operation is initiated by a first coherent tile within the M×N mesh topology. A snoop vector is generated by the first coherent tile, wherein the snoop vector indicates one or more other tiles within the M×N mesh topology to be notified of the snoop operation. One or more directional snoop vectors (DSVs) are created by the first coherent tile, wherein the creating includes logically combining the snoop vector that was generated with each of the one or more LSVs. An adjacent coherent tile to the first coherent tile is selected, wherein the adjacent coherent tile is located in a cardinal direction from the first coherent tile. A first DSV is chosen from the one or more DSVs, wherein the choosing is based on the cardinal direction. The snoop operation and the first DSV that was chosen are sent by the first coherent tile to the adjacent coherent tile that was selected.

A mesh topology that comprises M×N elements is described above. The M×N elements, which can be referred to generically as tiles associated with the mesh topology, can include elements based on a variety of configurations that perform a variety of operations, and so on. The tiles have been described as switching units (SUs), where the switching units can communicate with their nearest neighbor SUs that are located in cardinal directions from each SU. A given SU can be configured to perform one or more operations. Each SU can include one or more elements. An SUs can be configured as a coherent mesh unit (CMU), a memory controller interface (MCI), an input/output (I/O) mesh interface (IMI), and so on. A first block diagram of a switching unit is shown 600. The SU can be configured to enable coherency management. The switching unit 610 can communicate with nearest neighbor SUs that are located in cardinal directions from the SU 610. The nearest neighbor communications can include cardinal directions to the east 612, to the west 614, to the north 616, and to the south 618.

Recall that the cardinal directions can be prioritized. In embodiments, the cardinal direction priority can be east/west, then north/south.

The switching unit 610 can include a mesh interface unit (MIU) 620. In embodiments, the MIU can initiate a snoop operation. The snoop operation can be associated with a memory access operation such as a read (load), write (store), read-modify-write, and so on. In embodiments, the MIU can generate a snoop vector. The snoop vector can include one or more other tiles within the M×N mesh topology to be notified of the snoop operation. The one or more other tiles within the mesh topology can access a substantially similar address in storage such as a shared storage element or system. The shared storage can include shared cache storage. The MIU can communicate with other MIUs associated with further switching units using one or more interfaces. The switching unit 610 can include one or more mesh interface blocks (MIBs). The MIBs can enable communication between the SU 610 and other SUs within the mesh. The other SUs can be located in cardinal directions from the SU 610. The SU shown can include four MIBs such as MIB 622, MIB 624, MIB 626, and MIB 628. MIB 622 enables communication to the east, MIB 624 enables communication to the west, MIB 626 enables communication to the north, and MIB 628 enables communication to the south.

In embodiments, the switching unit comprises a coherent tile. The coherent tile can accomplish coherency within a block such as a cache coherency block. The cache coherency block can include processors such as processor cores, local cache memory, shared cache memory, intermediate memories, and so on. In embodiments, the first coherent tile includes a cache coherency block (CCB) such as CCB 0 630 and a coherency ordering agent (COA) such as a COA 632. The CCB can include a "block" of storage, where the block can include one or more of shared local cache, shared intermediate cache, and so on. The CCB can maintain coherency among cores such as processor cores, tiles, switching units, etc. The COA can be used to control coherency with other elements outside of the M×N mesh. The CCB and the COA can be included in one or more coherent tiles of switching units within the M×N mesh. In embodiments, the adjacent coherent tile can include a CCB and a COA. The adjacent block CCB and COA can be used to maintain memory coherency within the adjacent coherent tile. In embodiments, the adjacent coherent tile can include one or more memory control interfaces (MCIs).

The COA can be used to order cache accesses based on an address to be accessed. The address can include a target address associated with a memory load operation or a memory store operation. The COA can include a directory-based snoop filter (DSF) such as DSF 634. The DSF can be used to determine the current owner of a block of memory. The block of memory can include a cache line, a block of cache lines, and so on. In embodiments, the DSF can include an M-way associative set of tables that includes an index number, a valid bit, a presence vector, an owner ID field, an owner valid field, and so on. The COA can be used to determine which cache to access. The cache can include a last level cache such as last level cache (LLC) 0 636. The LLC can be accessible by two or more of the switching units within the M×N mesh, a plurality M×N meshes, and so on. The LLC can include a cache between the M×N mesh and a shared memory such as a shared system memory.

The cache coherency, as described above and throughout, can be based on snoop requests and snoop responses. The snoop requests and the snoop responses can be communicated among the tiles of the M×N mesh using various communication techniques appropriate to accessing a system-on-a-chip (SOC). The communication techniques can be based on one or more subnetworks associated with the MxN mesh. In embodiments, the subnetworks can include a request subnetwork (REQ). The REQ can receive requests for memory access from one or more cache coherency blocks (CCBs) and can send the requests to one or more coherency ordering agents (COAs). The REQ can further receive requests from one or more COAs and can send the requests to one or more memory I/O devices. The memory I/O devices can be associated with memories such as shared local, intermediate, and last level caches; a shared memory system; and the like. In embodiments, the subnetworks can include a snoop subnetwork (SNP). The snoop subnetwork can be used to send snoop requests to cache control blocks associated with one or more tiles within the MxN mesh.

In embodiments, the subnetworks can include a completion response network (CRSP). A completion response can be associated with completion of a memory access operation. The completion response can be received from a memory such as a shared cache memory, shared system memory, and so on. The completion response can be sent to one or more cache ordering agents associated with one or more tiles within the MxN mesh. In embodiments, the subnetworks can include a snoop response subnetwork. A snoop response can include a response to a snoop initiated by a coherent tile (e.g., a switching unit) within the MxN array. A snoop response can include a snoop response status. A snoop response received from a memory can be sent to one or more coherency ordering agents. The snoop response subnetwork can also receive a completion acknowledgement from one or more cache coherency blocks. The completion acknowledgement, such as a CompletionAck, can be sent to one or more coherency ordering agents.

Figure 6B:
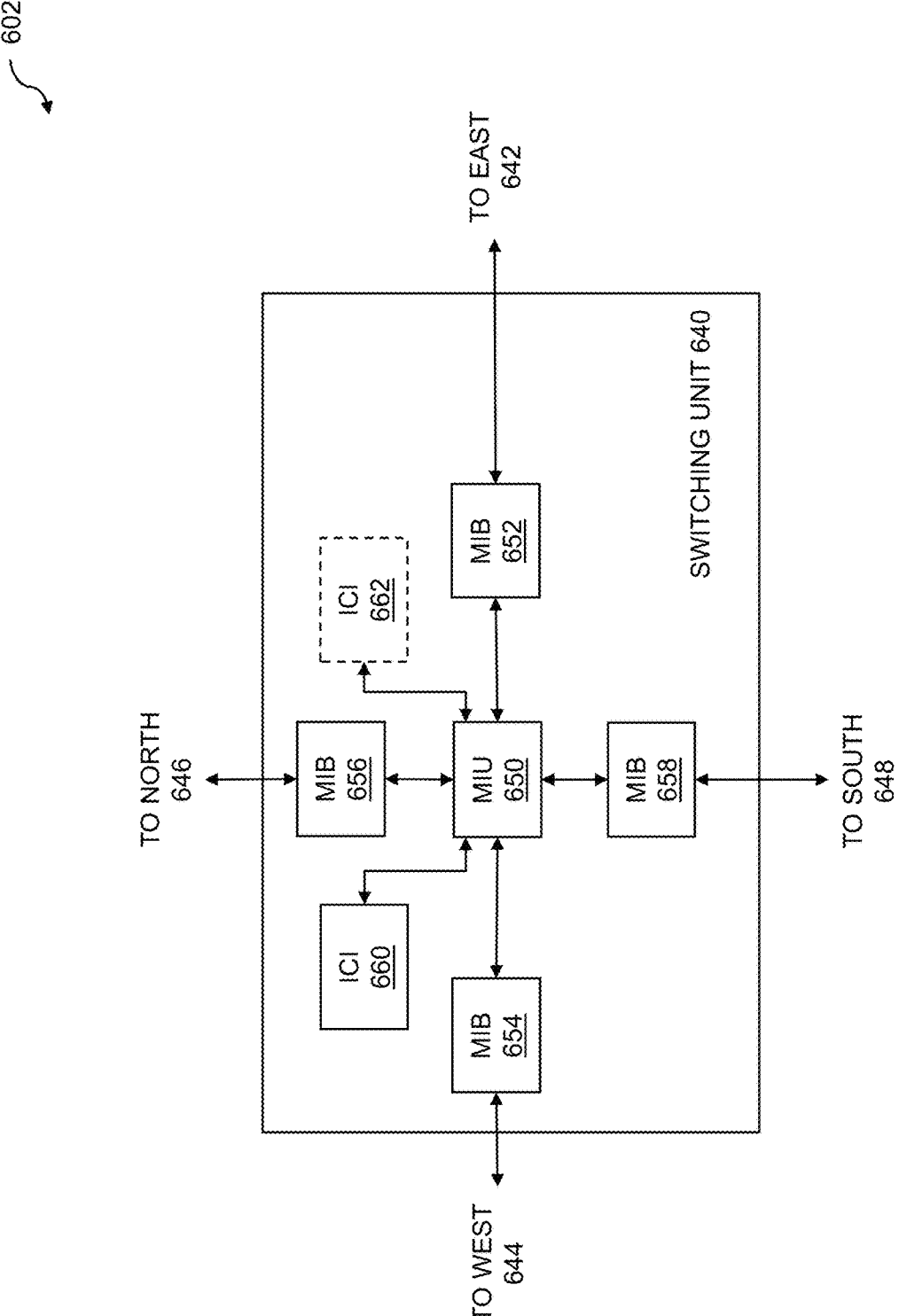
FIG. 6B is a second block diagram of a switching unit (SU).

FIG. 6B is a second block diagram of a switching unit (SU). The previous block diagram showed a switching unit block diagram where the SU included elements for managing cache coherency. A second block diagram of a switching unit or tile can show an SU configuration that includes one or more input/output (I/O) control interfaces (ICIs). The one or more ICIs support multi-cast snoop vectors within a mesh topology. The second block diagram can include one or more elements, where the one or more elements can include substantially similar elements found in the first block diagram, substantially different elements, and so on. Discussed above and throughout, the mesh topology includes MxN elements. The MxN elements or tiles within the mesh topology can be included based on SU configurations, operations performed, and so on. The tiles, also described as switching units, can communicate with their nearest neighbor SUs that are located in cardinal directions from each SU. A given SU can be configured to perform one or more operations. Each SU can include one or more elements. A second block diagram of a switching unit is shown 602. The switching unit 640 or tile can communicate with nearest neighbor SUs that are located in cardinal directions from the SU 640. The nearest neighbor communications can include cardinal directions to the east 642, to the west 644, to the north 646, and to the south 648. The cardinal directions can be prioritized, such as in embodiments, the cardinal direction priority can be east/west, then north/south.

The switching unit 640 can include a mesh interface unit (MIU) 650. In embodiments, the MIU can initiate a snoop operation. The snoop operation can be associated with I/O control operation. The I/O control interface can enable communication from the switching unit to other switching units using a network-on-chip (NoC) technique. Communications between an SU and one or more other SUs can include one or more snoop requests, one or more snoop responses, etc. The snoop requests and responses can be associated with memory accesses such as load accesses, store accesses, and so on. The MIU can communicate with other MIUs associated with further switching units using one or more interfaces. The switching unit 640 can include one or more mesh interface blocks (MIBs). The MIBs can enable communication between the SU 640 and other SUs within the mesh. The other SUs can be located in cardinal directions from the SU 640. The SU shown can include four MIBs such as MIB 652, MIB 654, MIB 656, and MIB 658. MIB 652 enables communication to the east, MIB 654 enables communication to the west, MIB 656 enables communication to the north, and MIB 658 enables communication to the south. In embodiments, the adjacent coherent tile can include one or more I/O control interfaces (ICIs). The switching unit 640 can communicate with other tiles within the MxN mesh using one or more I/O control interfaces. The switching unit can include an I/O control interface 660. The I/O control interface can control access by the MIU to send snoop request, to receive snoop responses, and so on. More than one I/O control interface can be included. In the switching unit 640, an additional ICI such as ICI 662 can be included.

Figure 6C:
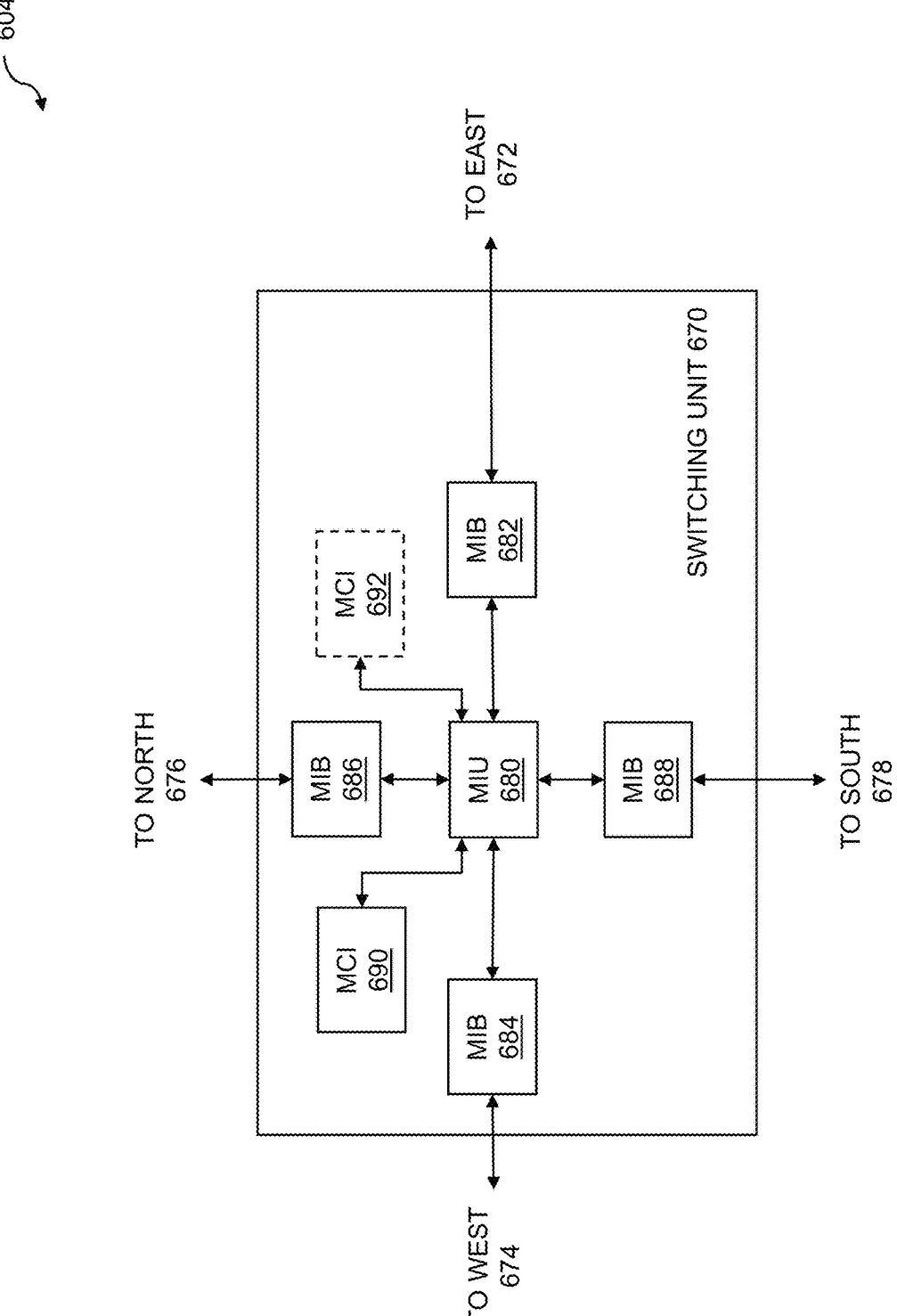
FIG. 6C is a third block diagram of a switching unit (SU).

FIG. 6C is a third block diagram of a switching unit (SU). The previous block diagrams showed switching unit block diagrams where the SU included elements for managing cache coherency or for I/O control. A third block diagram of a switching unit or tile can show an SU configuration that includes one or more memory control interfaces (MCIs). The one or more MCIs support multi-cast snoop vectors within a mesh topology. The third block diagram can include one or more elements. The one or more elements associated with the block can include substantially similar elements found in the first or second block diagrams, substantially different elements, and so on. For the SU that includes one or more MCIs, the mesh topology includes MxN elements. As for the previous block diagrams, the MxN elements or tiles that can be included within the mesh topology can be based on SU configurations, types of operations performed, and so on. The tiles or switching units can communicate with their nearest neighbor SUs that are located in cardinal directions from each SU. A given SU can be configured to perform one or more operations. Each SU can include one or more elements. A third block diagram of a switching unit is shown 604. The switching unit 670 or tile can communicate with nearest neighbor SUs located in cardinal directions from the SU 670. The nearest neighbor communications can include cardinal directions to the east 672, to the west 674, to the north 676, and to the south 678. The cardinal directions can be prioritized, where the cardinal direction priority can be east/west, then north/south.

The switching unit 640 can include a mesh interface unit (MIU) 680. Discussed previously, the MIU can initiate a snoop operation. The snoop operation can be associated with a memory access operation. The memory access operation can include a load or read operation, a store or write operation, a read-modify-write operation, and so on. The memory access operation can access various types of memory such as shared memory. The memory can include local cache, shared local cache, various levels of intermediate cache, last level cache, a shared memory system, etc. The memory access operations can be preceded by one or more snoop operations and one or more snoop responses, as discussed above. The memory accesses can target addresses with a shared memory. The MIU within the switching unit can communicate with other MIUs associated with further switching units using one or more interfaces. The switching unit 670 can include one or more mesh interface blocks (MIBs) to enable communication between the SU 670 and other SUs within the mesh. The other SUs can be located in cardinal directions from the SU 670. The SU shown can include four MIBs such as MIB 682, MIB 684, MIB 686, and MIB 688. MIB 682 enables communication to the east, MIB 684 enables communication to the west, MIB 686 enables communication to the north, and MIB 688 enables communication to the south. In embodiments, the adjacent coherent tile includes one or more memory control interfaces (MCIs). The switching unit 670 can access one or more memories such as shared memories within the M×N mesh using one or more memory control interfaces. The switching unit can include memory control interface 690. More than one memory control interface can be included. Additional MCIs can be used to access different memories, to enable parallel load and store operations, and so on. In the switching unit 670, an additional MCI such as MCI 692 can be included.

The M×N mesh can include further subnetworks. In embodiments, the subnetworks can include a read data subnetwork (RDAT). The read data subnetwork can be used to receive read data from one or more shared memories in response to one or more snoop responses. In embodiments, snoop response data can be received from one or more cache coherency blocks. Received snoop response data can be sent to one or more coherency ordering agents. In embodiments, the subnetworks can include a write data subnetwork (WDAT). The write data subnetwork can transfer write data generated by one or more tiles within the M×N mesh. In embodiments, the WDAT can receive write data from one or more cache coherency blocks. The received write data can be written to storage such as local cache storage shared among tiles. In embodiments, the write that is received can be sent to one or more coherency ordering agents. The COAs can be associated with a single tile, can include COAs associated with a plurality of tiles, etc. In other embodiments, the WDAT can send write data from one or more COAs to a memory. The memory can include a shared cache memory such as a shared local cache, intermediate cache, last level cache, and the like. The memory can include a shared memory system. The read data subnetwork and the write data subnetwork can comprise virtual networks. The RDAT subnetwork and the WDAT subnetwork can include virtual networks based on a data network associated with the system-on-a-chip.

Figure 7:
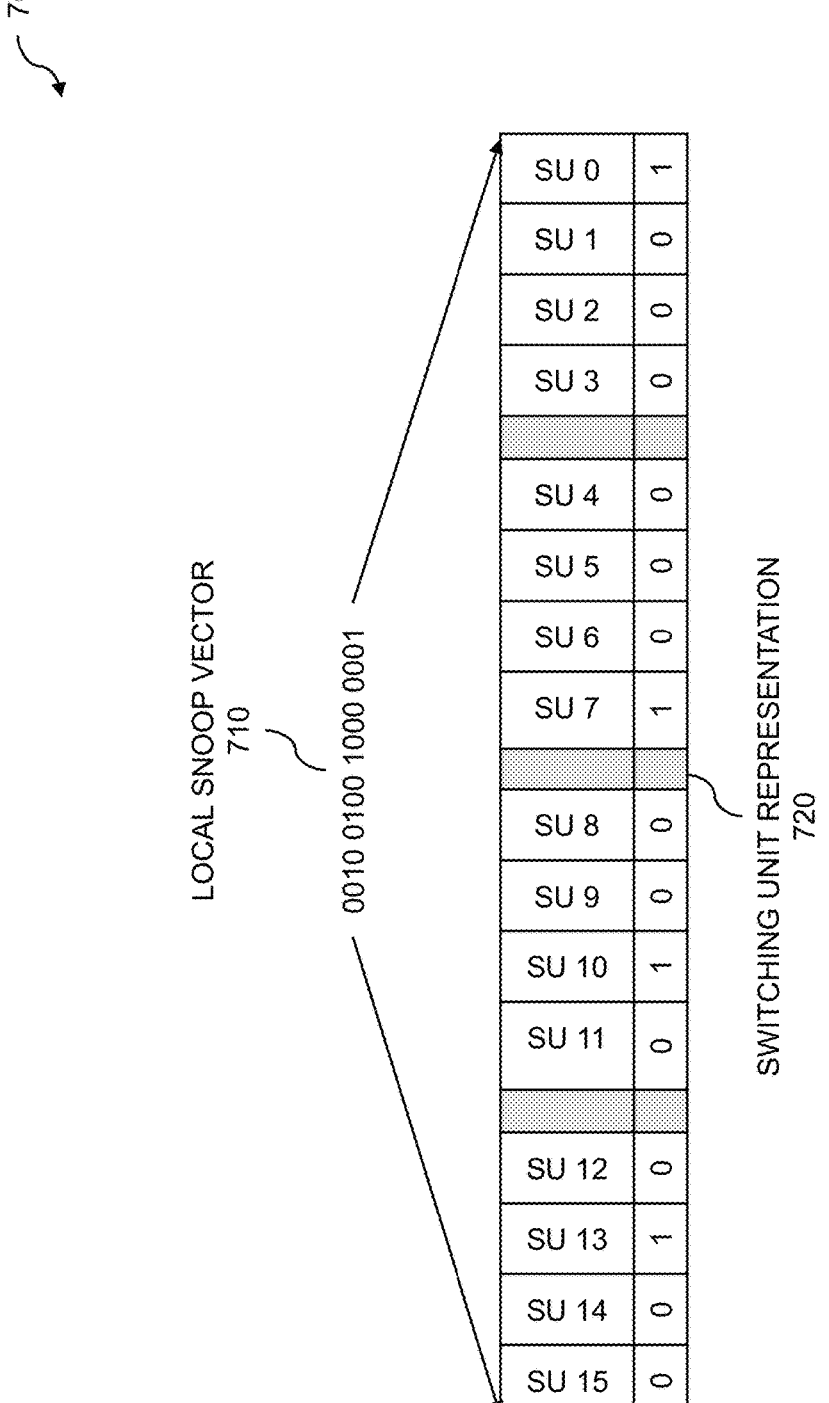
FIG. 7 is an example of a local snoop vector (LSV) for a 4×4 mesh.

FIG. 7 is an example of a local snoop vector (LSV) for a 4×4 mesh. A snoop operation can be initiated by a first coherent tile (e.g., a switching unit (SU)) when an operation such as one that loads data from or writes data to shared memory is executed. The shared memory can include various levels of shared cache memory, a shared system memory, and so on. The snoop operation can be used to alert one or more other coherent tiles within a mesh such as an M×N mesh that the first coherent tile needs to access memory. A snoop vector can be generated that can indicate which other tiles within the mesh should be notified that the first coherent tile requires memory access. One or more directional snoop vectors (DSVs) can be created by the first coherent tile. The directional snoop vectors can be created by logically combining the snoop vector with each of one or more local snoop vectors (LSVs). The LSV can indicate which coherent tiles can be accessed in one or more cardinal directions from the first coherent vector. A DSV can be chosen and sent to an adjacent coherent tile. The one or more LSVs support multi-cast snoop vectors within a mesh topology. A system-on-a-chip (SOC) is accessed, wherein the SOC includes a network-on-a-chip (NOC), wherein the NOC includes an M×N mesh topology, wherein the M×N mesh topology includes a coherent tile at each point of the M×N mesh topology, and wherein each coherent tile in the M×N mesh topology includes one or more local snoop vectors (LSVs). A first coherent tile within the M×N mesh topology initiates a snoop operation. A snoop vector is generated by a first coherent tile, wherein the snoop vector indicates one or more other tiles within the M×N mesh topology to be notified of the snoop operation. One or more directional snoop vectors (DSVs) are created by the first coherent tile, wherein the creating includes logically combining the snoop vector that was generated with each of the one or more LSVs. An adjacent coherent tile to the first coherent tile is chosen, wherein the adjacent coherent tile is located in a cardinal direction from the first coherent tile. The snoop operation and the first DSV that were chosen are sent by the first coherent tile to the adjacent coherent tile that was selected.

An example local snoop vector (LSV) is shown 700. An LSV 710 can include a number of bits, where the number of bits associated with the vector can be substantially equal to the number of tiles or switching units (SUs) associated with an M×N mesh. For an M×N mesh comprising 4×4 tiles, the number of bits associated with the LSV equals 16 bits. Each bit can represent an SU 720 within the mesh. For example, a first bit can be associated with tile SU 0, a second bit can be associated with SU 1, and so on. Each bit can be set to one or reset to 0. One or more bits within the LSV can be set to one, and the remaining bits can be reset to zero. If a bit is set to 1, the snoop operation can indicate that the SU represented by the set bit should be notified about the snoop operation. The SU is notified because the SU that initiated the snoop operation and the SU to be notified can require access to a location in memory. The location can include a single address within the memory, a memory block, etc. The location can include one or more cache lines within shared storage.

FIG. 8 shows local snoop vectors for a 4×4 mesh. A first coherent tile, such as a switching unit (SU) within a mesh of SUs, can initiate a snoop operation. A snoop operation can be shared with other SUs to indicate that the first SU requires access to a location, address, region, etc. of memory. The access can be based on a memory access operation such as a memory load or store operation. The memory can include shared local cache, a shared memory system, and so on. The snoop operation and a directional snoop vector (DSV) can be used to notify other SUs of the request for memory access by the first SU by sharing the snoop vector and the DSV with an adjacent SU. The adjacent SU can be located in a cardinal direction such as to the east, west, north, and south of the SU that initiated the snoop operation. The DSV can be created by logically combining the snoop vector with one or more local snoop vectors. The local snoop vectors can indicate which other SUs can be notified by the first SU. The local snoop vectors can eliminate sending the snoop vector back to the SU that initiated the snoop operation. One or more local snoop vectors support multi-cast snoop vectors within a mesh topology. A system-on-a-chip (SOC) is accessed, wherein the SOC includes a network-on-a-chip (NOC), wherein the NOC includes an M×N mesh topology, wherein the M×N mesh topology includes a coherent tile at each point of the M×N mesh topology, and wherein each coherent tile in the M×N mesh topology includes one or more local snoop vectors (LSVs). A first coherent tile within the M×N mesh topology initiates a snoop operation. A snoop vector is generated by a first coherent tile, wherein the snoop vector indicates one or more other tiles within the M×N mesh topology to be notified of the snoop operation. One or more directional snoop vectors (DSVs) are created by the first coherent tile, wherein the creating includes logically combining the snoop vector that was generated with each of the one or more LSVs. An adjacent coherent tile to the first coherent tile is chosen, wherein the adjacent coherent tile is located in a cardinal direction from the first coherent tile. The snoop operation and the first DSV that were chosen are sent by the first coherent tile to the adjacent coherent tile that was selected.

The figure shows local snoop vectors 800. The local snoop vectors can be associated with tiles such as switching units within a mesh. Directional snoop vectors or DSVs can be created by a first coherent tile. The first coherent tile can include a tile within the M×N mesh of tiles. The directional snoop vectors can indicate which SUs within the mesh can be contacted from a given SU. The DSUs vary depending on a cardinal direction in which a snoop vector can be sent. The DSUs are created by logically combining the snoop vector with each of one or more local snoop vectors (LSVs). The LSVs each contain a number of bits, where the number of bits corresponds to the number of SUs with the M×N mesh. For example, for an M×N mesh comprising 4×4 SUs, the number of bits in each LSV equals 16 bits. A bit in an LSV can be set to one if the SU corresponding to that bit position can be "reached" by the first SU. If an SU cannot be reached or does not exist, then the LSV bit can be set to zero. In a first usage example, consider the north LSV 810 associated with SU 0, such as SU 0 510 above. Since SU 0 is in the "top" row of the mesh, there are no SUs available to the north of SU 0. Therefore, all of the bits associated with the north LSV of SU 0 are equal to zero. In a second usage example, the south LSV 812 associated with SU 15 540 above is all set to zero because there are no SUs located to the "south" of SU 15.

Consider the nontrivial example 814 of the local snoop vectors associated with SU 5 such as SU 5 520 above. Four local snoop vectors can be associated with SU 5, one each for east, west, north, and south cardinal directions. In embodiments, the cardinal direction priority can be east/west, then north/south. As a result of the cardinal direction priority, some SUs can be accessed or notified by first sending vectors east or west before sending vectors north or south. The north local snoop vector associated with SU 5 includes a one in the position corresponding to SU 1 while all other positions include zeros. This pattern occurs because communication with other SUs in the first row is accomplished by first sending to the east or west. The east and west local snoop vectors include ones in bit positions associated with two columns to the east and one column to the west, respectively. The SUs in the mesh columns to the east are accessed by first sending to the east once or twice, then sending to the north or the south. The mesh column to the west of SU 5 is accessed by first sending vectors to the west. The south local snoop vector associated with SU 5 includes ones in positions associated with SU 9 and SU 13. These are the only two SUs to the south of SU 5 within the M×N mesh that can be notified without first sending to the east or to the west.

Figure 9:
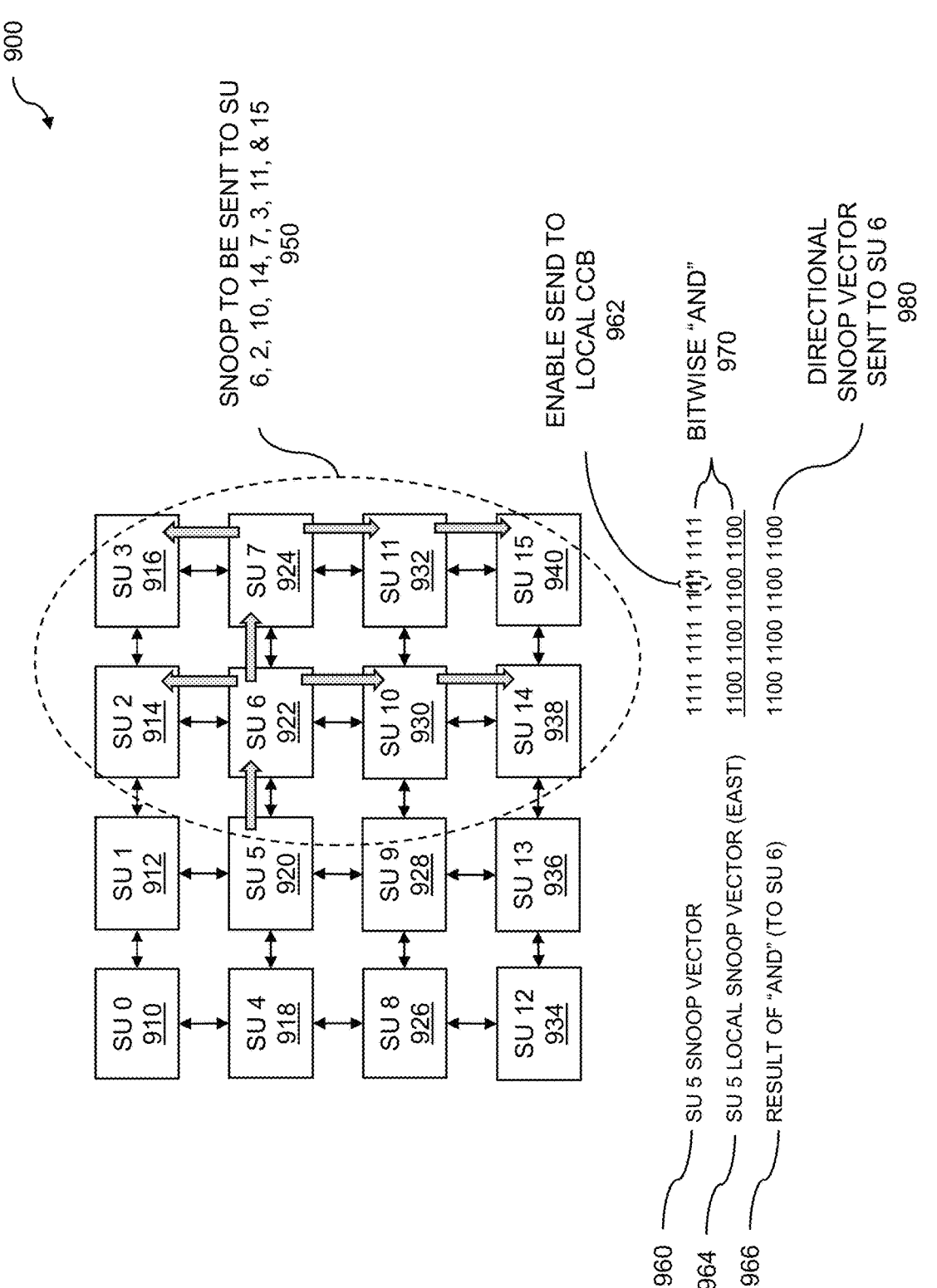
FIG. 9 is an example of sending a snoop to the east.

FIG. 9 is an example of sending a snoop to the east. Discussed previously and throughout, a snoop operation and a chosen directional snoop vector (DSV) can be sent by a first coherent tile or switching unit (SU) to an adjacent SU. The adjacent SU can be in a cardinal direction from the first SU. The DSV can be selected based on a cardinal direction priority. In embodiments, the cardinal direction priority can be east/west, then north/south. The adjacent SU can send the snoop vector and an additional DSV to further SUs. The SUs can be located in cardinal directions from the SU adjacent to the first SU. Based on the cardinal direction priority, the first SU can notify other SUs within an M×N array of SU. The notification can be based on a memory access request such as a load or store request from the first SU. The sending a snoop to the east supports multi-cast snoop vectors within a mesh topology. A system-on-a-chip (SOC) is accessed, wherein the SOC includes a network-on-a-chip (NOC), wherein the NOC includes an M×N mesh topology, wherein the M×N mesh topology includes a coherent tile at each point of the M×N mesh topology, and wherein each coherent tile in the M×N mesh topology includes one or more local snoop vectors (LSVs). A first coherent tile within the M×N mesh topology initiates a snoop operation. A snoop vector is generated by a first coherent tile, wherein the snoop vector indicates one or more other tiles within the M×N mesh topology to be notified of the snoop operation. One or more directional snoop vectors (DSVs) are created by the first coherent tile, wherein the creating includes logically combining the snoop vector that was generated with each of the one or more LSVs. An adjacent coherent tile to the first coherent tile is chosen, wherein the adjacent coherent tile is located in a cardinal direction from the first coherent tile. The snoop operation and the first DSV that were chosen are sent by the first coherent tile to the adjacent coherent tile that was selected.

An example of sending a snoop to the east is shown 900. The snoop can be initiated by a coherent tile within an M×N mesh. The coherent tile can include a switching unit (SU). The M×N mesh can include a 4×4 mesh. The 4×4 mesh can include SUs SU 0 910, SU 1 912, SU 2 914, SU 3 916, SU 4 918, SU 5 920, SU 6 922, SU 7 924, SU 8 926, SU 9 928, SU 10 930, SU 11 932, SU 12 934, SU 13 936, SU 14 938, and SU 15 940. The M×N mesh can include other numbers of SUs. In the example, a snoop operation can be initiated by a first coherent tile or switching unit such as SU 5 920. Based on cardinal direction priority, such as east/west, then north/south, the snoop vector can be sent to the east. A snoop vector can be used to notify one or more SUs in the mesh of a snoop operation, such SUs 950, which include SU 2, SU 3, SU 6, SU 7, SU 10, SU 11, SU 14, and SU 15. A snoop vector 960 can be generated by the first coherent tile that can generate a snoop vector. The snoop vector can include a number of bits equal to the number of coherent tiles in the M×N array. In embodiments, the bits can control a flow of sent snoop operations and directional snoop vectors. Flow control bits can include "flits". In the example shown, the snoop vector can include 16 bits, one bit for each of the coherent tiles in the 4×4 array. The snoop vector can include a one to indicated that an SU should be notified of a snoop operation, or a zero to indicate that notification of the corresponding SU in not necessary. Note that the bit position for SU 5, the initiating SU, is set to 1 962. The one in the SU 5 position can indicate that the local cache coherency block (CCB) associated with SU 5 can receive a notification.

Continuing the example, one or more directional snoop vectors (DSV) can be created. The DSVs can be created by logically ANDing the snoop vector with one or more local snoop vectors (LSVs). The ANDing can include a bit-wise logical AND 970. Since the snoop vector 960 will be sent to the east, SU 5 local snoop vector (east) 964 can be selected for the logical combining. The local snoop vector includes ones in the position for the SUs that can be reached by sending east. The result of the ANDing of the SU 5 snoop vector and the SU 5 local snoop vector (east) is shown 966. The resulting vector 966 comprises a directional snoop vector (DSV) 980. In embodiments, the snoop operation and the DSV are sent by the first coherent tile, SU 5, to the adjacent coherent tile, SU 6. From SU 6, additional directional snoop vectors can be created to notify other SUs east of SU 5.

Figure 10:
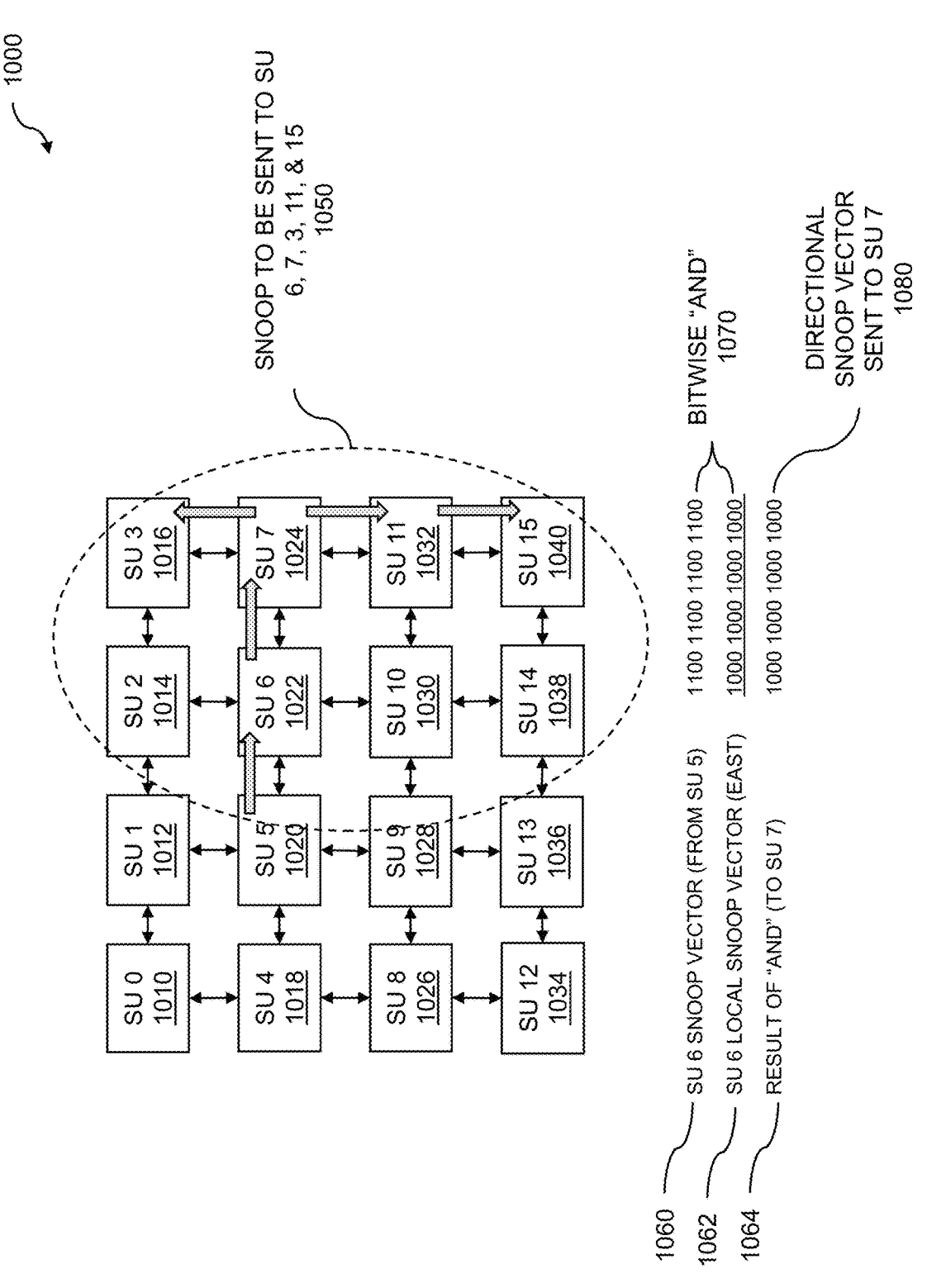
FIG. 10 is a second example of sending a snoop to the east.

FIG. 10 is a second example of sending a snoop to the east. A snoop operation can be sent further east in an M×N mesh. The M×N mesh can include coherent tiles such as switching units (SUs). The SUs within the M×N mesh, in this example a 4×4 mesh, can include SUS SU 0 1010, SU 1 1012, SU 2 1014, SU 3 1016, SU 4 1018, SU 5 1020, SU 6 1022, SU 7 1024, SU 8 1026, SU 9 1028, SU 10 1030, SU 11 1032, SU 12 1034, SU 13 1036, SU 14 1038, and SU 15 1040. Described above, a snoop operation initiated by a switching unit (SU), such as SU 5, can continue to be sent to the east in order to notify further switching units within an M×N mesh. Recall that the snoop operation and a chosen directional snoop vector (DSV) were sent to the east from SU 5 to SU 6 since SU 6 was the SU adjacent to the east of SU 5. Embodiments can include generating, by the adjacent coherent tile, one or more second DSVs. The one or more DSVs can be created based on the DSV sent by the first SU (SU 5). In embodiments, the generating can include logically combining the first DSV with each of one or more adjacent LSVs. The one or more adjacent LSVs can include one or more DSVs associated with the adjacent SU. The generating the one or more DSVs by SU 6 can enable notification of SUs located to the east, then to the north and south of the adjacent SU, SU 6. In embodiments, the logically combining can be based on an AND function. The generating the second DSVs by the adjacent SU can enable sending the snoop operation and a second DSV to a second adjacent coherent tile or SU. The snoop operation and the second DSV can be sent to further SUs within the mesh. The snoop can be sent 1050 to SU 3, SU 7, SU 11, and SU 15.

Recall that the first coherent tile (discussed above) can send the snoop operation and the first DSV that was chosen to an adjacent coherent tile. In embodiments, the second adjacent coherent tile is not the first coherent tile. Further embodiments include generating, by the adjacent coherent tile, one or more second DSVs, wherein the generating includes logically combining the first DSV with each of one or more adjacent LSVs. In the example 1000, the first DSV 1060 includes an SU 6 1022 snoop vector received from SU 5. The first DSV is logically combined with an SU 6 local snoop vector 1062. The chosen SU 6 snoop vector can include the east vector. The logical combining can include a bitwise AND 1070. The result of the bitwise AND includes DSV 1064. DSV 1064 is sent 1080 from SU 6 to SU 7. Further embodiments include identifying a second adjacent coherent tile, wherein the second adjacent coherent tile is located in a second cardinal direction from the adjacent coherent tile. Coherent tile SU 7 is located at the east edge of the mesh, so no further sending to the east is possible. Further, coherent tile SU 7 cannot send back to SU 6, so no sending to the west is possible. Sending from SU 7 can include sending north to SU 3, or south to SU 11, then on to SU 15.

Figure 11:
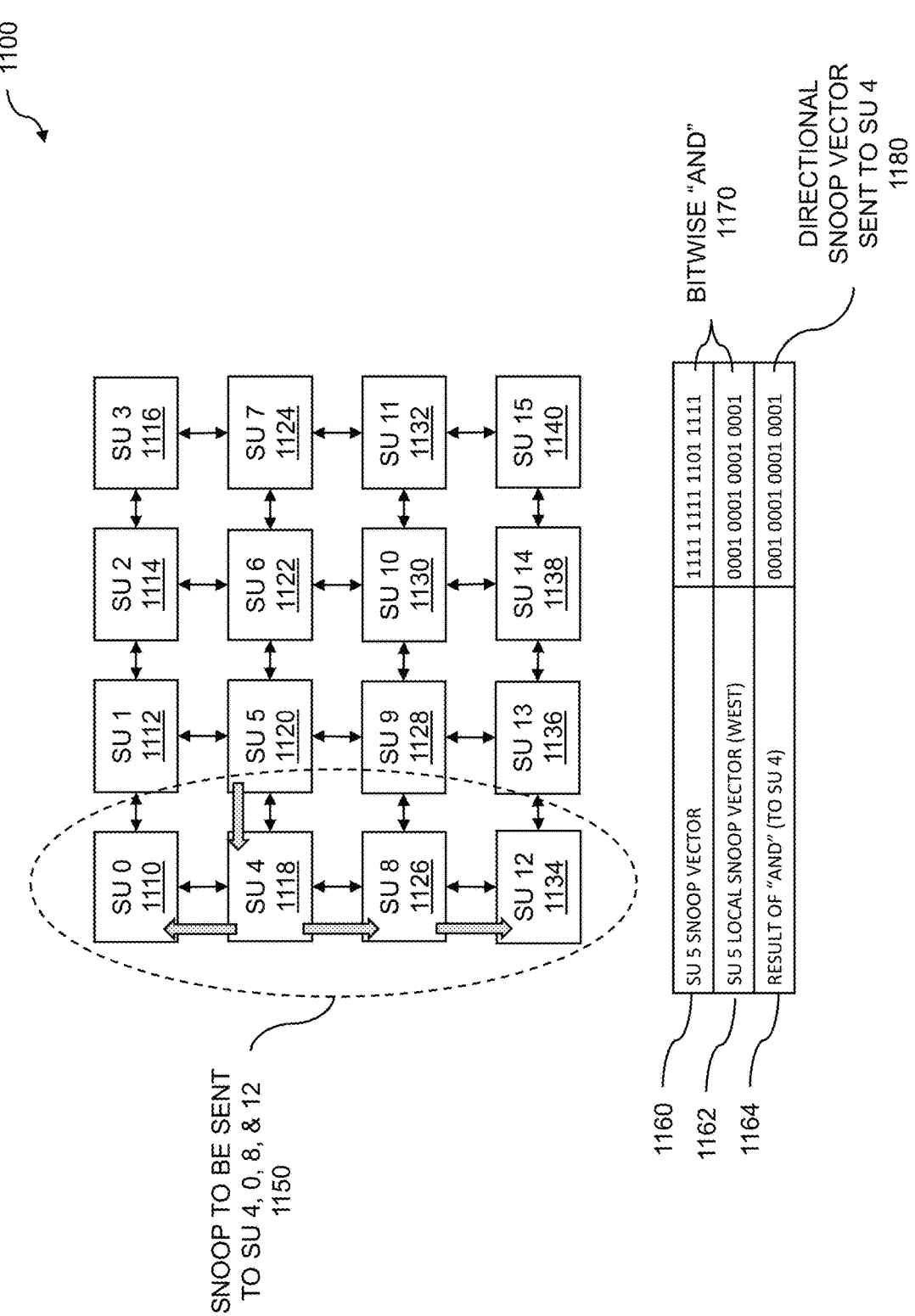
FIG. 11 is an example of sending a snoop to the west.

FIG. 11 is an example of sending a snoop to the west. In previous examples, a coherent tile sent a snoop operation and a directional snoop vector (DSV) to a selected, adjacent coherent tile. Recall that the DSV was created by logically combining a generated snoop vector with one or more local snoop vectors (LSVs). Recall also that the one or more LSVs are based on a cardinal direction priority, where the cardinal direction priority can be east/west, then north/south. Thus, the next round of sending a snoop can include sending a snoop to the west in an M×N mesh. The M×N mesh can include a 4×4 mesh of coherent tiles, where the coherent tiles can include switching units (SUs). The SUs within the M×N mesh can include SUs SU 0 1110, SU 1 1112, SU 2 1114, SU 3 1116, SU 4 1118, SU 5 1120, SU 6 1122, SU 7 1124, SU 8 1126, SU 9 1128, SU 10 1130, SU 11 1132, SU 12 1134, SU 13 1136, SU 14 1138, and SU 15 1140. Described above, a snoop operation initiated by a switching unit (SU), such as SU 5, can be sent to the west in order to notify further switching units within an M×N mesh. Embodiments can include generating, by the first coherent tile, a snoop vector, wherein the snoop vector indicates one or more other tiles within the M×N mesh topology to be notified of the snoop operation. In the example 1100, the first coherent tile can include SU 5 1120. In embodiments, the generating can include logically combining the first DSV with each of one or more adjacent LSVs. The generating the one or more DSVs by SU 5 can enable notification of SUs located to the west, then to the north and south of the first SU, SU 5. In embodiments, the logically combining can be based on a bitwise AND function 1170. The generating the DSVs by the first SU can enable sending the snoop operation and a DSV to an adjacent coherent tile or SU. The snoop operation and the DSV can be sent to further SUs within the mesh. The snoop can be sent 1150 to SU 0, SU 4, SU 8, and SU 12.

The first coherent tile or SU can send the snoop operation and the first DSV that was chosen to an adjacent coherent tile. The adjacent coherent tile can be to the west of the first coherent tile. Embodiments include creating, by the first coherent tile, one or more DSVs, wherein the generating includes logically combining the snoop vector with each of one or more LSVs. In this example, the snoop vector 1160 includes an SU 5 1120 snoop vector generated by SU 5. The snoop vector is logically combined with an SU 5 local snoop vector 1162. The chosen SU 5 snoop vector can include the west snoop vector. The logical combining can include a bitwise AND 1170. The result of the bitwise AND includes DSV 1164. DSV 1164 is sent 1180 from SU 5 west to SU 4. Further embodiments include identifying a second adjacent coherent tile, wherein the second adjacent coherent tile is located in a second cardinal direction from the adjacent coherent tile. Coherent tile SU 4 is located at the west edge of the mesh, so no further sending to the west is possible. Further, coherent tile SU 4 cannot send back to SU 5, so no sending to the east is possible from SU 4. Sending from SU 4 can include sending north to SU 0, or south to SU 8, then on to SU 12.

Figure 12:
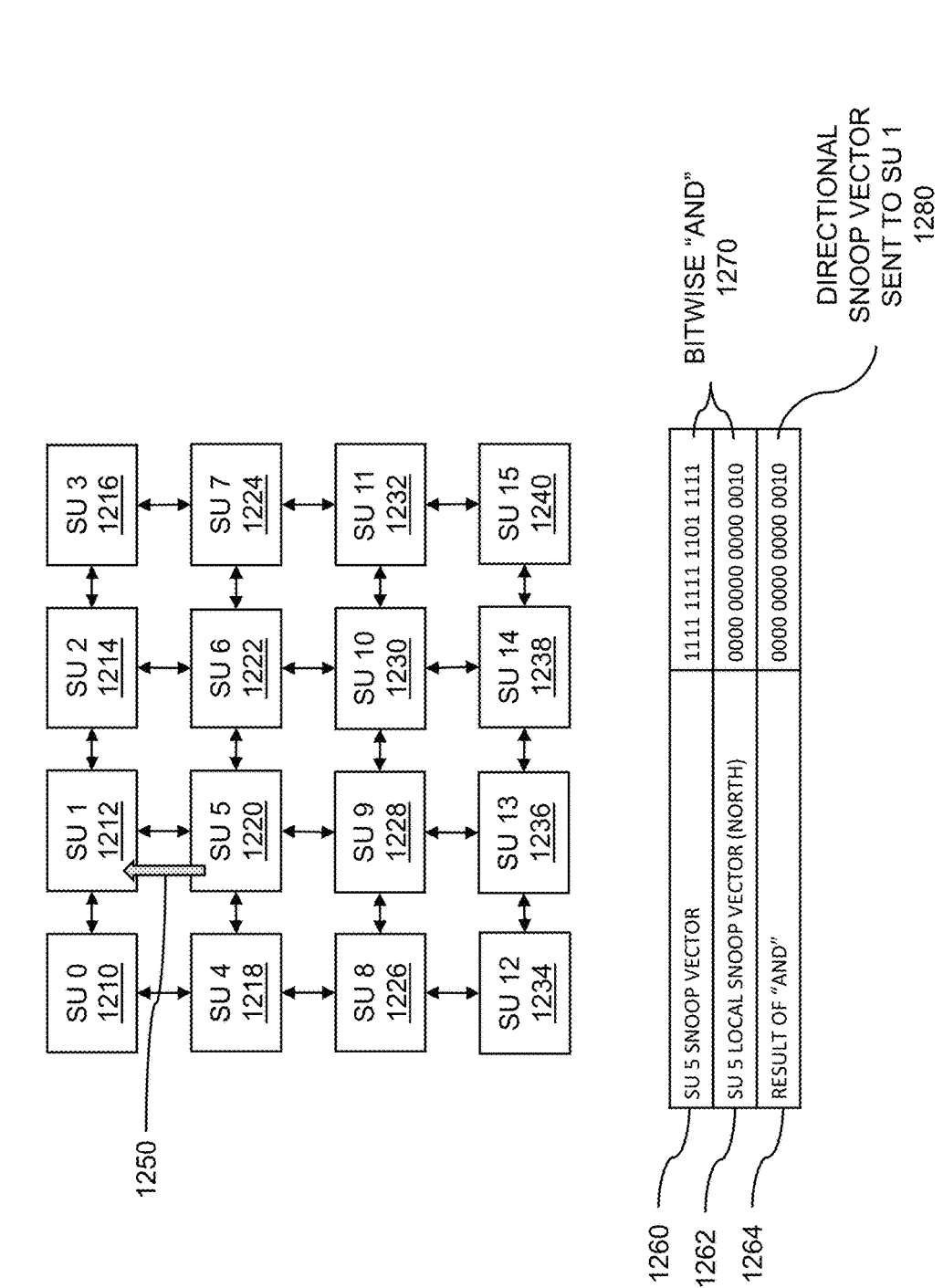
FIG. 12 is an example of sending a snoop to the north.

FIG. 12 is an example of sending a snoop to the north. In previous examples, a coherent tile sent a snoop operation and a directional snoop vector (DSV) to a selected, adjacent coherent tile. The DSV was created by logically combining a generated snoop vector with one or more local snoop vectors (LSVs). The logically combining can be based on an AND operation. The one or more LSVs are based on a cardinal direction priority, where the cardinal direction priority can be east/west, then north/south. In previous examples, the sending was the east and to the west. In this example, the sending a snoop can include sending a snoop to the north within an M×N mesh, such as a 4×4 mesh of coherent tiles. The coherent tiles can include switching units (SUs). The SUs within the M×N mesh can include SUs SU 0 1210, SU 1 1212, SU 2 1214, SU 3 1216, SU 4 1218, SU 5 1220, SU 6 1222, SU 7 1224, SU 8 1226, SU 9 1228, SU 10 1230, SU 11 1232, SU 12 1234, SU 13 1236, SU 14 1238, and SU 15 1240. Recall that a snoop operation initiated by a switching unit (SU), such as SU 5, can be sent to the north in order to notify further switching units within an M×N mesh. Embodiments can include generating, by the first coherent tile, a snoop vector. The snoop vector indicates one or more other tiles within the M×N mesh topology to be notified of the snoop operation. In the example 1200, the first coherent tile can include SU 5 1220, and the tile to the north can include SU 1 1212. In embodiments, the creating can include logically combining the generated snoop vector with each of one or more adjacent LSVs. The logically combining can include a bitwise AND operation 1270. The creating the one or more DSVs by SU 5 can enable notification of SUs located to the north, then to the north of the first SU, SU 5. The generating the DSVs by the first SU can enable sending the snoop operation and a DSV to an adjacent coherent tile or SU.

The first coherent tile can send the snoop operation and the first DSV that was chosen to an adjacent coherent tile to the north of the first coherent tile. Embodiments include creating, by the first coherent tile, one or more DSVs, wherein the generating includes logically combining the snoop vector with each of one or more LSVs. In this example, the snoop vector 1260 includes a snoop vector generated by SU 5 1220. The snoop vector is logically combined with an SU 5 local snoop vector 1262. The chosen SU 5 snoop vector can include the north snoop vector. The logical combining can include a bitwise AND 1270. The result of the bitwise AND includes DSV 1264. DSV 1264 is sent 1280 from SU 5 north to SU 1, as shown by arrow 1250. Since there are no further SUs to the north of SU 1, no additional DSVs need to be created for sending to the north.

Figure 13:
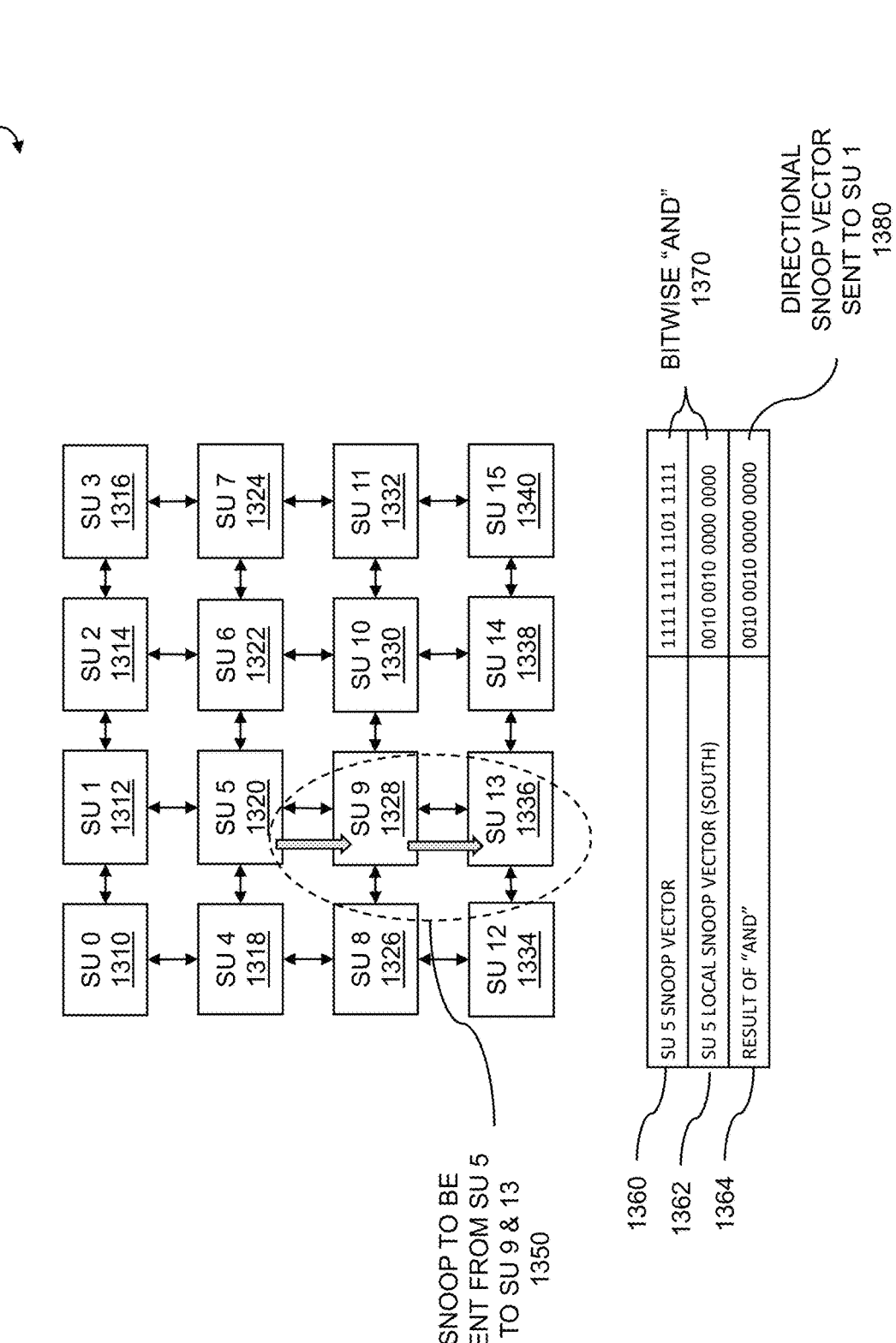
FIG. 13 is an example of sending a snoop to the south.

FIG. 13 is an example of sending a snoop to the south. Having exhausted other cardinal directions east, west, and north, a snoop operation and a directional snoop vector (DSV) can be sent to the south of a first coherent tile or switching unit (SU). The sending can be to an adjacent coherent tile. The DSV was created by logically combining a generated snoop vector with one or more local snoop vectors (LSVs). The snoop vector was generated when other tiles within a mesh such as an M×N mesh are to be notified of a snoop operation initiated by a first coherent tile within the mesh. Recall that the one or more LSVs are based on a cardinal direction priority, where the cardinal direction priority can be east/west, then north/south. Thus, the last round of sending a snoop can include sending a snoop to the south in the M×N mesh such as 4×4 mesh of coherent tiles. The coherent tiles can include switching units (SUs). The SUs within the M×N mesh can include SUs SU 0 1310, SU 1 1312, SU 2 1314, SU 3 1316, SU 4 1318, SU 5 1320, SU 6 1322, SU 7 1324, SU 8 1326, SU 9 1328, SU 10 1330, SU 11 1332, SU 12 1334, SU 13 1336, SU 14 1338, and SU 15 1340. A snoop operation initiated by a switching unit (SU), such as SU 5, can be sent to the south in order to notify further switching units within an M×N mesh. Embodiments can include generating, by the first coherent tile, a snoop vector, wherein the snoop vector indicates one or more other tiles within the M×N mesh topology to be notified of the snoop operation. In the example 1300, the first coherent tile can include SU 5 1320. In embodiments, the generating can include logically combining the first DSV with each of one or more adjacent LSVs. The generating the one or more DSVs by SU 5 can enable notification of SUs located to the south of the first SU, SU 5. In embodiments, the logically combining can be based on a bitwise AND function 1370. The generating the DSVs by the first SU can enable sending the snoop operation and a DSV to an adjacent coherent tile or SU. The snoop operation and the DSV can be sent to further SUs within the mesh. The snoop can be sent to a subset of SUs 1350, such as SU 9 1328, and SU 13 1336.

The first coherent tile such as an SU can send the snoop operation and the first DSV that was chosen to an adjacent coherent tile. In this example, the adjacent coherent tile can be to the south of the first coherent tile. Embodiments include creating, by the first coherent tile, one or more DSVs, wherein the generating includes logically combining the snoop vector with each of one or more LSVs. In this example, the snoop vector 1360 includes an SU 5 snoop vector generated by SU 5 1320. The snoop vector is logically combined with an SU 5 local snoop vector 1362, where the chosen SU 5 snoop vector can include the south snoop vector. The logical combining can include a bitwise AND 1370 operation. The result of the bitwise AND includes DSV 1364. DSV 1364 is sent 1380 from SU 5 to the south to SU 9. Further embodiments include identifying a second adjacent coherent tile, wherein the second adjacent coherent tile is located in a second cardinal direction from the adjacent coherent tile. Coherent tile SU 9 is located within the mesh, rather than on an edge, so further sending to the south is possible. In addition, coherent tile SU 9 cannot send back to SU 5, so no sending back to the north is possible from SU 9. Further sending south from SU 9 can include sending south to SU 13 1336.

Figure 14:
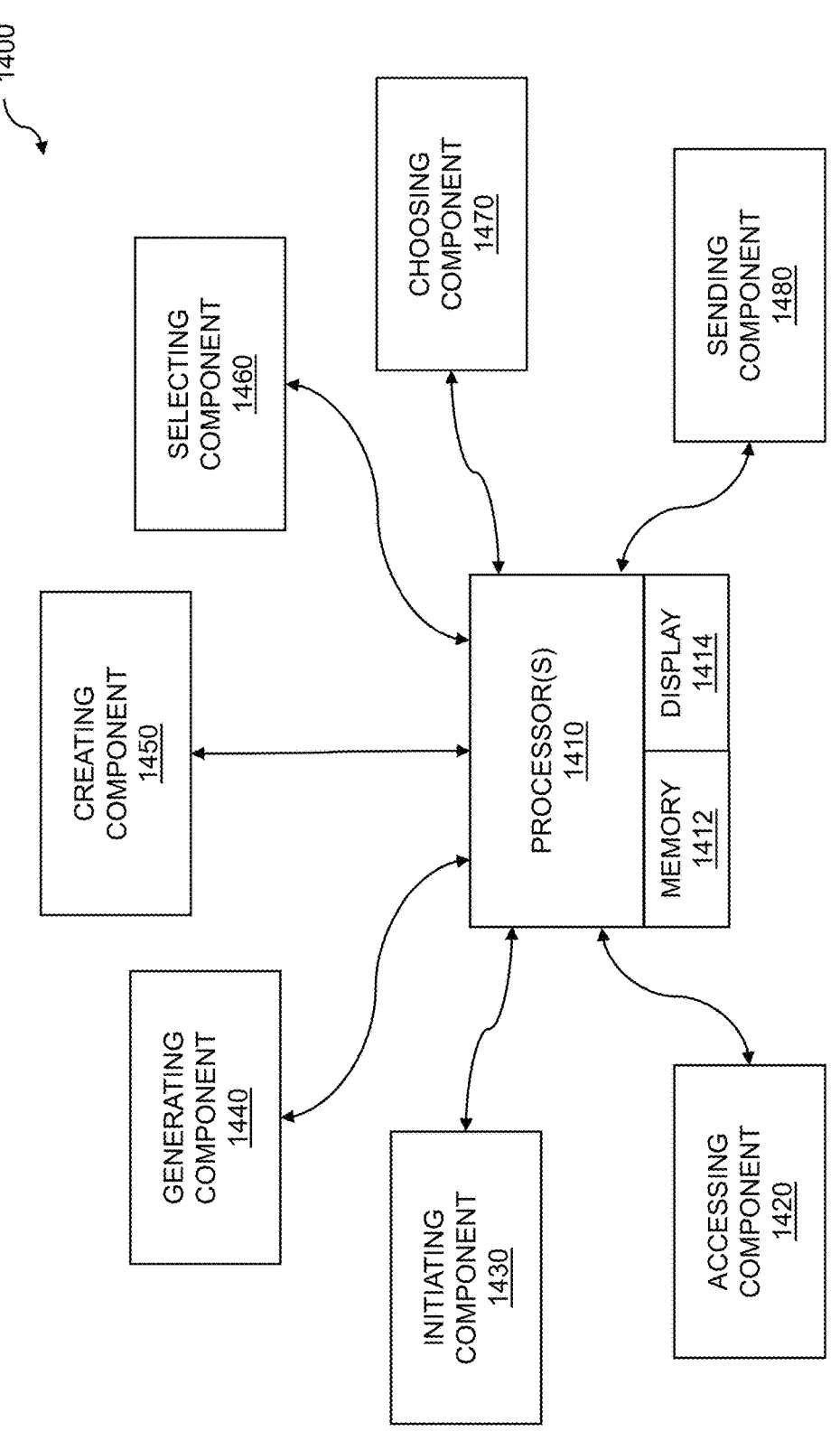
FIG. 14 is a system diagram for multi-cast snoop vectors within a mesh topology.

FIG. 14 is a system diagram for multi-cast snoop vectors within a mesh topology. The system can comprise a processor-implemented system for sharing data. The computer system can be based on semiconductor logic. The system can include one or more of processors, memories, cache memories, queues, displays, and so on. The system 1400 can include one or more processors 1410. The processors can include standalone processors within integrated circuits or chips, processor cores in FPGAs or ASICs, two or more processor cores within a multiprocessor, and so on. The one or more processors 1410 are attached to a memory 1412, which stores instructions, operations, snoop vectors, local snoop vectors, directional snoop vectors, and so on. The memory can include one or more of local memory, shared cache memory, shared hierarchical cache memory, system memory such as shared system memory, etc. The system 1400 can further include a display 1414 coupled to the one or more processors 1410. The display 1414 can be used for displaying data, instructions, operations, memory queue contents, various types of vectors, and the like. The operations can include snoop operations and snoop operation responses. The operations can further include cache maintenance operations, Advanced extensible Interface (AXI™) Coherence Extensions (ACE™) cache transactions, Advanced Microcontroller Bus Architecture (AMBA™) Coherence Hub Interface (CHI™) transactions, etc.

In embodiments, one or more processors 1410 are coupled to the memory 1412, wherein the one or more processors, when executing the instructions which are stored, are configured to: access a system-on-a-chip (SOC), wherein the SOC includes a network-on-a-chip (NOC), wherein the NOC includes an M×N mesh topology, wherein the M×N mesh topology includes a coherent tile at each point of the M×N mesh topology, and wherein each coherent tile in the M×N mesh topology includes one or more local snoop vectors (LSVs); initiate, by a first coherent tile within the M×N mesh topology, a snoop operation; generate, by the first coherent tile, a snoop vector, wherein the snoop vector indicates one or more other tiles within the M×N mesh topology to be notified of the snoop operation; create, by the first coherent tile, one or more directional snoop vectors (DSVs), wherein the creating includes logically combining the snoop vector that was generated with each of the one or more LSVs; select an adjacent coherent tile to the first coherent tile, wherein the adjacent coherent tile is located in a cardinal direction from the first coherent tile; choose a first DSV from the one or more DSVs, wherein the choosing is based on the cardinal direction; and send, by the first coherent tile, to the adjacent coherent tile that was selected, the snoop operation and the first DSV that was chosen.

The system 1400 can include an accessing component 1420. The accessing component 1420 can access a system-on-a-chip (SOC). A SOC can include a variety of elements associated with a computing system such as one or more processor cores, input/output interfaces, local memory, memory interfaces, secondary memory interfaces, and so on. The SOC can further include elements such as radio frequency (RF) components, graphics processors, network-on-a-chip (NOC) connectivity, etc. The SOC can be based on one or more chips, FPGAs, ASICs, etc. In embodiments, the processor cores associated with the SOC can include RISC-V™ processor cores. Memory such as local memory within the SOCs includes a local cache. The local cache can include a shared local cache. The shared local cache that can be colocated with other elements associated with the SOC, can be accessible by a processor core within the SOC, and so on. The processor cores can implement special cache coherency operations. The cache coherency operations can include maintenance operations such as cache maintenance operations (CMOs). The cache coherency operations can include a cache line zeroing operation, a cache line cleaning operation, a cache line flushing operation, a cache line invalidating operation, and so on.

A plurality of processor cores and coupled local caches within an SOC can include a coherency domain. The coherency can include coherency between the common memory and cache memory, such as level 1 (L1) cache memory. L1 cache memory can include a local cache coupled to groupings of two or more processor cores. The coherency between the common memory and one or more local cache memories can be accomplished using cache maintenance operations (CMOs), described previously. In embodiments, two or more processor cores can generate read operations for a common memory structure. The read operations for the common memory can occur based on cache misses to local cache, thereby requiring the read operations to be generated for the common memory. In embodiments, each processor core within the SOC can access a common memory structure. The access to the common memory structure can be accomplished through a coherent network-on-chip. The common memory can include on-chip memory, off-chip memory, etc. The coherent network-on-chip comprises a global coherency.

The system 1400 can include an initiating component 1430. The initiating component 1430 can initiate, by a first coherent tile within the M×N mesh topology, a snoop operation. A snoop operation, or snoop request, can be supported within the SOC. A snoop operation can be used to determine which another coherent tile or tiles associated with the M×N mesh within SOC require access to a memory location or block, a cache line or cache line block, and so on. The snoop operation can be used to alert other coherent tiles such as switching units that a first coherent tile requires a memory access operation. The memory access operation can include a memory load, a memory store, a read-modify-write operation, etc. Snoop operations can look for one or more cache lines within local caches, in a shared hierarchical cache, in shared common memory, and so on. The snoop operations can be initiated due to one or more cache misses. The common memory can be coupled to the multiple caches associated with the M×N mesh using Network-on-Chip (NoC) technology. The snoop operations can be used to determine whether data access operations being performed by more than one coherent tile access the same memory address in one or more caches or the shared common memory. The snoop requests can further monitor transactions such as data reads from and data writes to the common memory. While read operations leave data contained within a cache or the common memory unchanged, a write operation to a cache or to the common memory can change the data. As a result, the copy of the data within a cache can become "incoherent" or "dirty" with respect to the common memory, either due to changes to the cache contents or changes to the common memory contents. The data changes, if not monitored and corrected using coherency management techniques, result in cache coherency hazards. That is, new data can overwrite old data before the old data is used, old data can be read before new data can be written, etc.

As data is accessed by the one or more coherent tiles within the mesh, data within memory such as a shared local cache can be updated and become "dirty". The dirty data within the shared local cache differs from the data in a memory such as a shared system memory from which the data in the shared local cache was loaded. Thus, the data in the shared system memory must be updated to reflect the changes to the data in the shared local memory. Further, other local copies of the data from the shared system memory must be updated. However, the versions of the data in the shared system memory and the versions of the copies of the data in other shared local caches may still be required by other coherent tiles. Thus, data such as cache lines can be sent to a buffer such as an eject buffer prior to writing to storage such as shared system memory. In embodiments, the evict buffer enables delayed writes. The delayed writes can include writes initiated by a coherent tile to a local cache such as an L1 cache, writes to a shared L2 cache such as a hierarchical cache, writes to a shared system memory, and so on.

The system 1400 can include a generating component 1440. The generating component 1440 can generate, by the first coherent tile, a snoop vector, wherein the snoop vector indicates one or more other tiles within the M×N mesh topology to be notified of the snoop operation. The snoop vector can include a number of bits, where the number of bits associated with the snoop vector is equal to the number of coherent tiles within the M×N array. In a usage example, a coherent tile within an M×N array comprising a 4×4 array generates a snoop vector that can include 16 bits. One snoop vector bit is associated with one coherent tile within the mesh. The value of each bit associated with the snoop vector can indicate whether the coherent tile associated with the snoop vector bit is to be notified of the snoop operation that was initiated by another coherent tile within the array. In a usage example, a bit value equal to one can indicate that the associated coherent tile is to be notified of the snoop operation, while a bit value equal to zero can indicate that the associated coherent tile need not be notified.

The system 1400 can include a creating component 1450. The creating component 1450 can create, by the first coherent tile, one or more directional snoop vectors (DSVs), wherein the creating includes logically combining the snoop vector that was generated with each of the one or more LSVs. Recall that coherent tiles are organized in an M×N mesh, where a coherent tile is included at each point of the MxN mesh topology. A coherent tile can communicate with adjacent coherent tiles that are located at cardinal directions from the coherent tile. For a first coherent tile located at the interior of the mesh, coherent tiles that are positioned adjacent to the first coherent tile are located in cardinal directions east, west, north, and south from the first tile. Thus, for an interior tile, up to four DSVs can be created. For a coherent tile located at an edge, such as an east, west, north, or south edge of the mesh, fewer than four DSVs may be created. In a usage example, for a coherent tile located at the upper left corner of the mesh, such as SU 0 discussed above, there are no adjacent tiles to the north nor to the west of SU 0. Thus, only two DSVs may be created. In embodiments, the logically combining the snoop vector with each of one or more local snoop vectors (LSVs) can be based on an AND function. The AND function can include a bitwise AND function.

The system 1400 can include a selecting component 1460. The selecting component 1460 can select an adjacent coherent tile to the first coherent tile, wherein the adjacent coherent tile is located in a cardinal direction from the first coherent tile. The selecting can be based on whether the adjacent coherent tile, or one that is accessible through the adjacent coherent tile, is to be notified of the snoop that was initiated by a coherent tile. In a usage example, a coherent tile to the east of the first coherent tile is to be notified of the snoop operation. The coherent tile to the east of the first tile can be selected as the adjacent coherent tile. The adjacent tile to the east of the first tile can also be selected because tiles located beyond the tile to the east, such as tiles further to the east, to the north, or to the south may require notification of the snoop operation. Discussed previously, the selecting of a coherent tile adjacent in a cardinal direction from the first coherent tile can be based on a priority. In embodiments, the cardinal direction priority can be east/west, then north/south.

The system 1400 can include a choosing component 1470. The choosing component 1470 can choose a first DSV from the one or more DSVs, wherein the choosing is based on the cardinal direction. Recall that one or more DSVs can be created based on the cardinal directions and on the priority of the cardinal directions. The first DSV can be a DSV associated with east, if available. If the DSV associated with east is not available, then the DSV associated with west, if available, can be chosen. Similar choosing can occur for a first DSV associated with north, and a first DSV associated with south. The system 1400 can include a sending component 1480. The sending component 1480 can send, by the first coherent tile, to the adjacent coherent tile that was selected, the snoop operation and the first DSV that was chosen. The sending can be accomplished using a variety of techniques appropriate to SOC communication. In embodiments, the sending is accomplished using network-on-a-chip (NOC) techniques.

The creating DSVs, selecting adjacent tiles, choosing DSVs, and sending to further additional tiles the snoop operation and the chosen DSV can be repeated for additional coherent tiles within the MxN mesh. Embodiments can further include generating, by the adjacent coherent tile, one or more second DSVs, wherein the generating includes logically combining the first DSV with each of one or more adjacent LSVs. The additional logical combining effectively serves to mask the input DSV to generate an output DSV. The masking can be used to determine which cardinal directions can be chosen for sending the snoop request and the DSV resulting from the logical combining. As for the first coherent tile, in embodiments, the logically combining can be based on an AND function. Further embodiments can include identifying a second adjacent coherent tile, wherein the second adjacent coherent tile is located in a second cardinal direction from the adjacent coherent tile. The identifying can be repeated for a third adjacent coherent tile, a fourth coherent tile, and so on, if indicated by the snoop request. The choosing can be accomplished so as to prevent backtracking, looping, and so on. In embodiments, the second adjacent coherent tile is not the first coherent tile.

The determining whether to repeat the creating, selecting, choosing, and sending can be accomplished using a variety of techniques. Further embodiments can include determining the one or more other tiles within the MxN mesh topology to be notified, wherein the determining is based on a directory-based snoop filter (DSF) within the first coherent tile. The DSF can be based on storage, directory, and other techniques. In one or more embodiments, the DSF can be an M-way associative set of tables that includes an index number, a valid bit, a presence vector, an owner ID field, and an owner valid field. In one or more embodiments, determining the owner can include obtaining a value in an owner ID field, and checking the validity in a corresponding owner valid field.

The system 1400 can include a computer program product embodied in a non-transitory computer readable medium for sharing data, the computer program product comprising code which causes one or more processors to generate semiconductor logic for: accessing a system-on-a-chip (SOC), wherein the SOC includes a network-on-a-chip (NOC), wherein the NOC includes an MxN mesh topology, wherein the MxN mesh topology includes a coherent tile at each point of the MxN mesh topology, and wherein each coherent tile in the MxN mesh topology includes one or more local snoop vectors (LSVs); initiating, by a first coherent tile within the MxN mesh topology, a snoop operation; generating, by the first coherent tile, a snoop vector, wherein the snoop vector indicates one or more other tiles within the MxN mesh topology to be notified of the snoop operation; creating, by the first coherent tile, one or more directional snoop vectors (DSVs), wherein the creating includes logically combining the snoop vector that was generated with each of the one or more LSVs; selecting an adjacent coherent tile to the first coherent tile, wherein the adjacent coherent tile is located in a cardinal direction from the first coherent tile; choosing a first DSV from the one or more DSVs, wherein the choosing is based on the cardinal direction; and sending, by the first coherent tile, to the adjacent coherent tile that was selected, the snoop operation and the first DSV that was chosen.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions-generally referred to herein as a "circuit," "module," or "system"—may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Disclosed embodiments are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM); an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States, then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A processor-implemented method for sharing data comprising:

accessing a system-on-a-chip (SOC), wherein the SOC includes a network-on-a-chip (NOC), wherein the NOC includes an M×N mesh topology, wherein M and N are both integers greater than 1, wherein the M×N mesh topology includes a coherent tile at each point of the M×N mesh topology, and wherein each coherent tile in the M×N mesh topology includes one or more local snoop vectors (LSVs);

initiating, by a first coherent tile within the M×N mesh topology, a snoop operation;

generating, by the first coherent tile, a snoop vector, wherein the snoop vector indicates one or more other tiles within the M×N mesh topology to be notified of the snoop operation;

creating, by the first coherent tile, one or more directional snoop vectors (DSVs), wherein the creating includes logically combining the snoop vector that was generated with each of the one or more LSVs;

selecting an adjacent coherent tile to the first coherent tile, wherein the adjacent coherent tile is located in a cardinal direction from the first coherent tile;

choosing a first DSV from the one or more DSVs, wherein the choosing is based on the cardinal direction; and sending, by the first coherent tile, to the adjacent coherent tile that was selected, the snoop operation and the first DSV that was chosen.

2. The method of claim 1 further comprising generating, by the adjacent coherent tile, one or more second DSVs, wherein the generating includes logically combining the first DSV with each of one or more adjacent LSVs.

3. The method of claim 2 wherein the logically combining is based on an AND function.

4. The method of claim 2 further comprising identifying a second adjacent coherent tile, wherein the second adjacent coherent tile is located in a second cardinal direction from the adjacent coherent tile.

5. The method of claim 4 wherein the second adjacent coherent tile is not the first coherent tile.

6. The method of claim 5 further comprising picking a second DSV from the one or more second DSVs, wherein the picking is based on the second cardinal direction.

7. The method of claim 6 further comprising forwarding, by the adjacent coherent tile, to the second adjacent coherent tile that was identified, the snoop operation and the second DSV that was picked.

8. The method of claim 1 further comprising determining the one or more other tiles within the M×N mesh topology to be notified, wherein the determining is based on a directory-based snoop filter (DSF) within the first coherent tile.

9. The method of claim 1 wherein the selecting includes a second adjacent coherent tile.

10. The method of claim 9 wherein the choosing includes an additional DSV.

11. The method of claim 10 further comprising transmitting, by the first coherent tile, the snoop operation and the additional DSV to the second adjacent coherent tile.

12. The method of claim 1 wherein the one or more LSVs are based on a cardinal direction priority.

13. The method of claim 12 wherein the cardinal direction priority is east/west, then north/south.

14. The method of claim 1 wherein the coherent tile at each point of the M×N mesh topology comprises a switching unit (SU).

15. The method of claim 1 wherein the first coherent tile includes a cache coherency block (CCB) and a coherency ordering agent (COA).

16. The method of claim 15 wherein the adjacent coherent tile includes a CCB and a COA.

17. The method of claim 15 wherein the adjacent coherent tile includes one or more memory control interfaces (MCIs).

18. The method of claim 17 wherein the adjacent coherent tile does not receive the snoop operation or the first DSV that was chosen.

19. The method of claim 15 wherein the adjacent coherent tile includes one or more I/O control interfaces (ICIs).

20. The method of claim 1 wherein the one or more LSVs comprises four LSVs.

21. The method of claim 20 wherein the four LSVs comprise a LSV for each of four cardinal directions from the first coherent tile.

22. The method of claim 1 wherein the logically combining comprises a logical AND function.

23. The method of claim 1 wherein the one or more LSVs are unique to the first coherent tile.

24. The method of claim 1 wherein the NOC includes a point-to-point packetized communication protocol.

25. The method of claim 1 wherein the snoop operation is an invalidating snoop operation.

26. A computer program product embodied in a non-transitory computer readable medium for sharing data, the computer program product comprising code which causes one or more processors to generate semiconductor logic for:

accessing a system-on-a-chip (SOC), wherein the SOC includes a network-on-a-chip (NOC), wherein the NOC includes an M×N mesh topology, wherein M and N are both integers greater than 1, wherein the M×N mesh topology includes a coherent tile at each point of the M×N mesh topology, and wherein each coherent tile in the M×N mesh topology includes one or more local snoop vectors (LSVs);

initiating, by a first coherent tile within the M×N mesh topology, a snoop operation;

generating, by the first coherent tile, a snoop vector, wherein the snoop vector indicates one or more other tiles within the M×N mesh topology to be notified of the snoop operation;

creating, by the first coherent tile, one or more directional snoop vectors (DSVs), wherein the creating includes logically combining the snoop vector that was generated with each of the one or more LSVs;

selecting an adjacent coherent tile to the first coherent tile, wherein the adjacent coherent tile is located in a cardinal direction from the first coherent tile;

choosing a first DSV from the one or more DSVs, wherein the choosing is based on the cardinal direction; and sending, by the first coherent tile, to the adjacent coherent tile that was selected, the snoop operation and the first DSV that was chosen.

27. A computer system for sharing data comprising:

a memory which stores instructions;

one or more processors coupled to the memory wherein the one or more processors, when executing the instructions which are stored, are configured to:

access a system-on-a-chip (SOC), wherein the SOC includes a network-on-a-chip (NOC), wherein the NOC includes an M×N mesh topology, wherein M and N are both integers greater than 1, wherein the M×N mesh topology includes a coherent tile at each point of the M×N mesh topology, and wherein each coherent tile in the M×N mesh topology includes one or more local snoop vectors (LSVs);

initiate, by a first coherent tile within the M×N mesh topology, a snoop operation;

generate, by the first coherent tile, a snoop vector, wherein the snoop vector indicates one or more other tiles within the M×N mesh topology to be notified of the snoop operation;

create, by the first coherent tile, one or more directional snoop vectors (DSVs), wherein the creating includes logically combining the snoop vector that was generated with each of the one or more LSVs;

select an adjacent coherent tile to the first coherent tile, wherein the adjacent coherent tile is located in a cardinal direction from the first coherent tile;

choose a first DSV from the one or more DSVs, wherein the choosing is based on the cardinal direction; and send, by the first coherent tile, to the adjacent coherent tile that was selected, the snoop operation and the first DSV that was chosen.

* * * * *